(12) United States Patent
Kinoshita

(10) Patent No.: US 9,645,760 B2
(45) Date of Patent: May 9, 2017

(54) STORAGE SYSTEM AND CONTROL METHOD THEREOF

(71) Applicant: KABUSHIKI KAISHA TOSHIBA, Minato-ku (JP)

(72) Inventor: Atsuhiro Kinoshita, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 52 days.

(21) Appl. No.: 14/721,360

(22) Filed: May 26, 2015

(65) Prior Publication Data

US 2016/0224271 A1    Aug. 4, 2016

Related U.S. Application Data

(60) Provisional application No. 62/109,432, filed on Jan. 29, 2015.

(51) Int. Cl.
*G06F 12/02* (2006.01)
*G06F 3/06* (2006.01)

(52) U.S. Cl.
CPC ............ *G06F 3/0647* (2013.01); *G06F 3/061* (2013.01); *G06F 3/0659* (2013.01); *G06F 3/0688* (2013.01)

(58) Field of Classification Search
CPC ...... G06F 3/067; G06F 3/0679; G06F 3/0688; G06F 3/0689; G06F 12/02; G06F 12/02027; G06F 12/04; G06F 12/060246; G06F 1/26; G06F 1/263; G06F 1/28; G06F 3/0647; G06F 3/0659; G06F 3/061
See application file for complete search history.

(56) References Cited

U.S. PATENT DOCUMENTS

| | | | | |
|---|---|---|---|---|
| 7,533,212 B1* | 5/2009 | Doblar | ............... | G06F 13/426 365/230.03 |
| 2008/0229133 A1* | 9/2008 | Yamanaka | ............ | G06F 1/3203 713/324 |
| 2010/0008175 A1* | 1/2010 | Sweere | ............... | G06F 12/0866 365/229 |
| 2010/0211721 A1 | 8/2010 | Resnick | | |
| 2010/0214813 A1* | 8/2010 | Choi | ........................ | G11C 5/04 365/51 |
| 2012/0117354 A1* | 5/2012 | Tatsumura | .......... | H04L 12/6418 711/200 |
| 2014/0195710 A1 | 7/2014 | Sasaki et al. | | |
| 2015/0058436 A1* | 2/2015 | Kurita | .................. | G06F 15/167 709/213 |
| 2015/0261698 A1* | 9/2015 | Zhang | ................. | G06F 13/1621 711/156 |
| 2016/0034191 A1* | 2/2016 | Kinoshita | ............... | G06F 3/061 711/103 |
| 2016/0092362 A1* | 3/2016 | Barron | ................ | G06F 12/0835 710/308 |

OTHER PUBLICATIONS

International Search Report and Written Opinion issued Nov. 10, 2015 in PCT/IB2015/056885.

* cited by examiner

*Primary Examiner* — Hiep Nguyen
(74) *Attorney, Agent, or Firm* — Oblon, McClelland, Maier & Neustadt, L.L.P.

(57) ABSTRACT

According to one embodiment, a storage system includes a plurality of memory units including a nonvolatile memory and a control unit which controls the nonvolatile memory, a routing unit which controls transfer of a packet between the memory units. The routing unit uses a partial address described in the packet and not the full address.

20 Claims, 27 Drawing Sheets

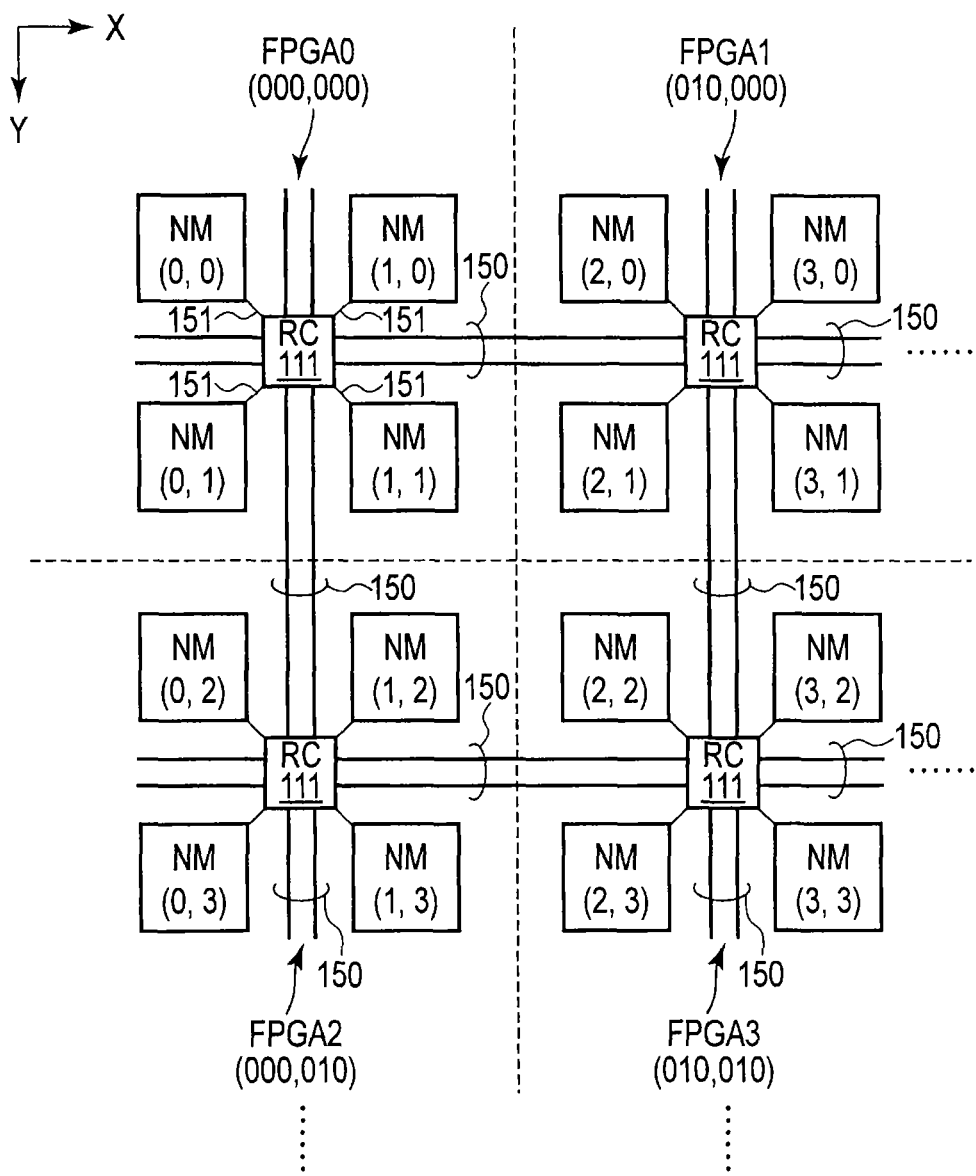
F I G. 2

Packet structure

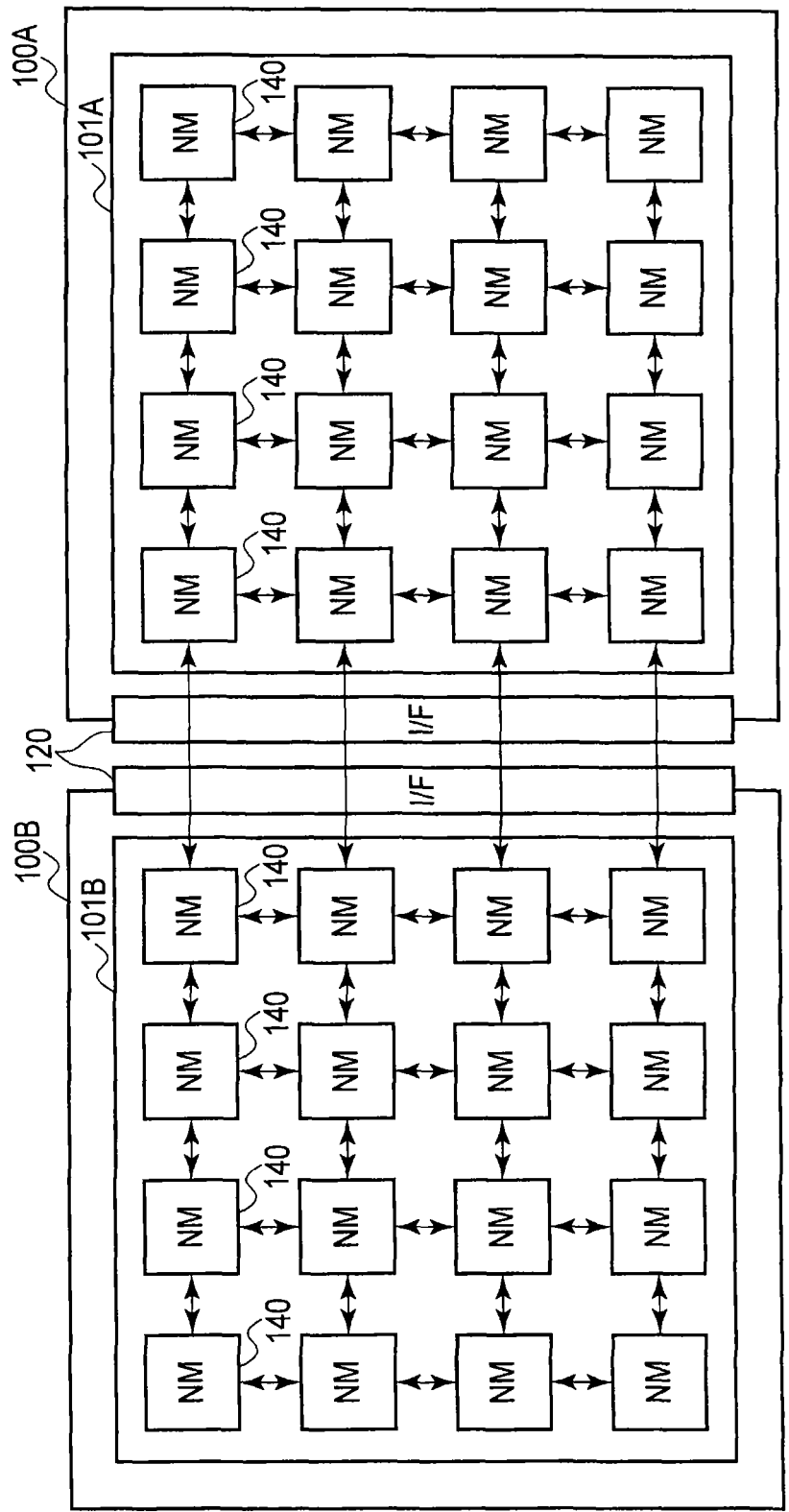
F I G. 12

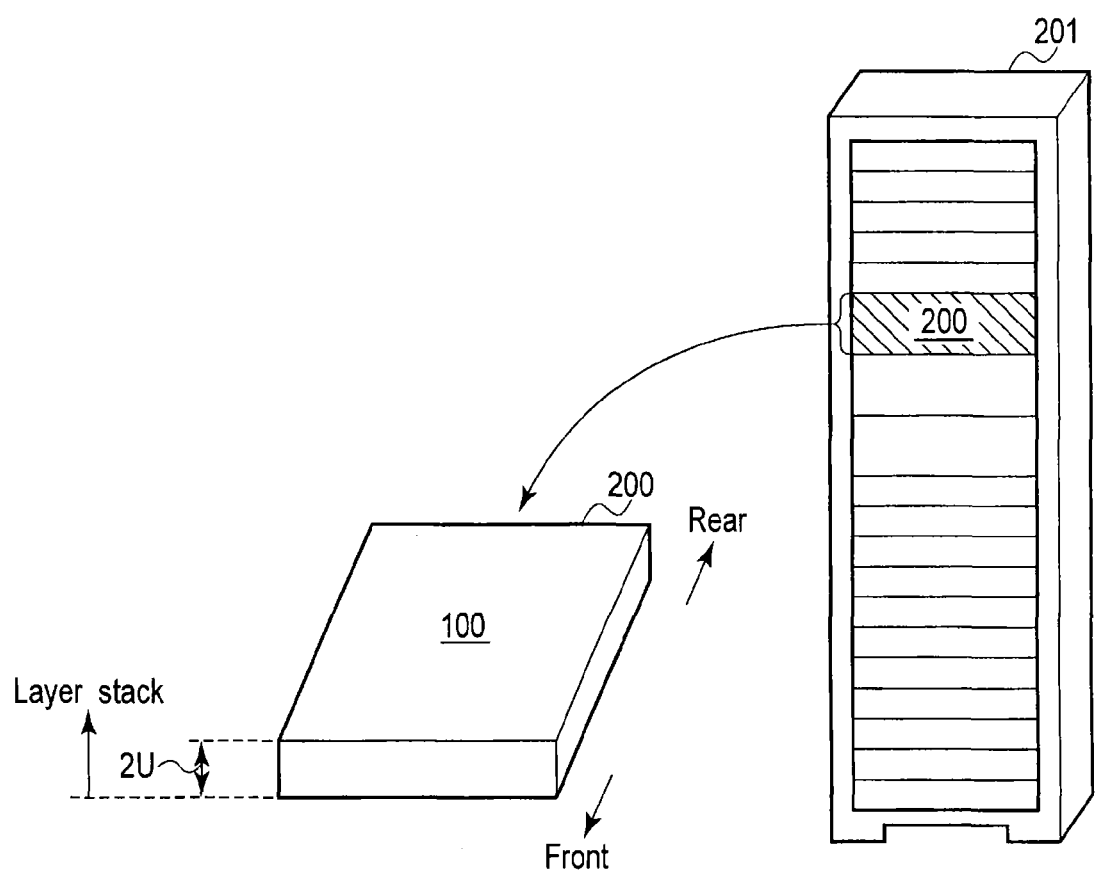
F I G. 13

Enclosure 200 (Front side)

Enclosure 200 (Rear side)

Enclosure 200 (Layer stack side)

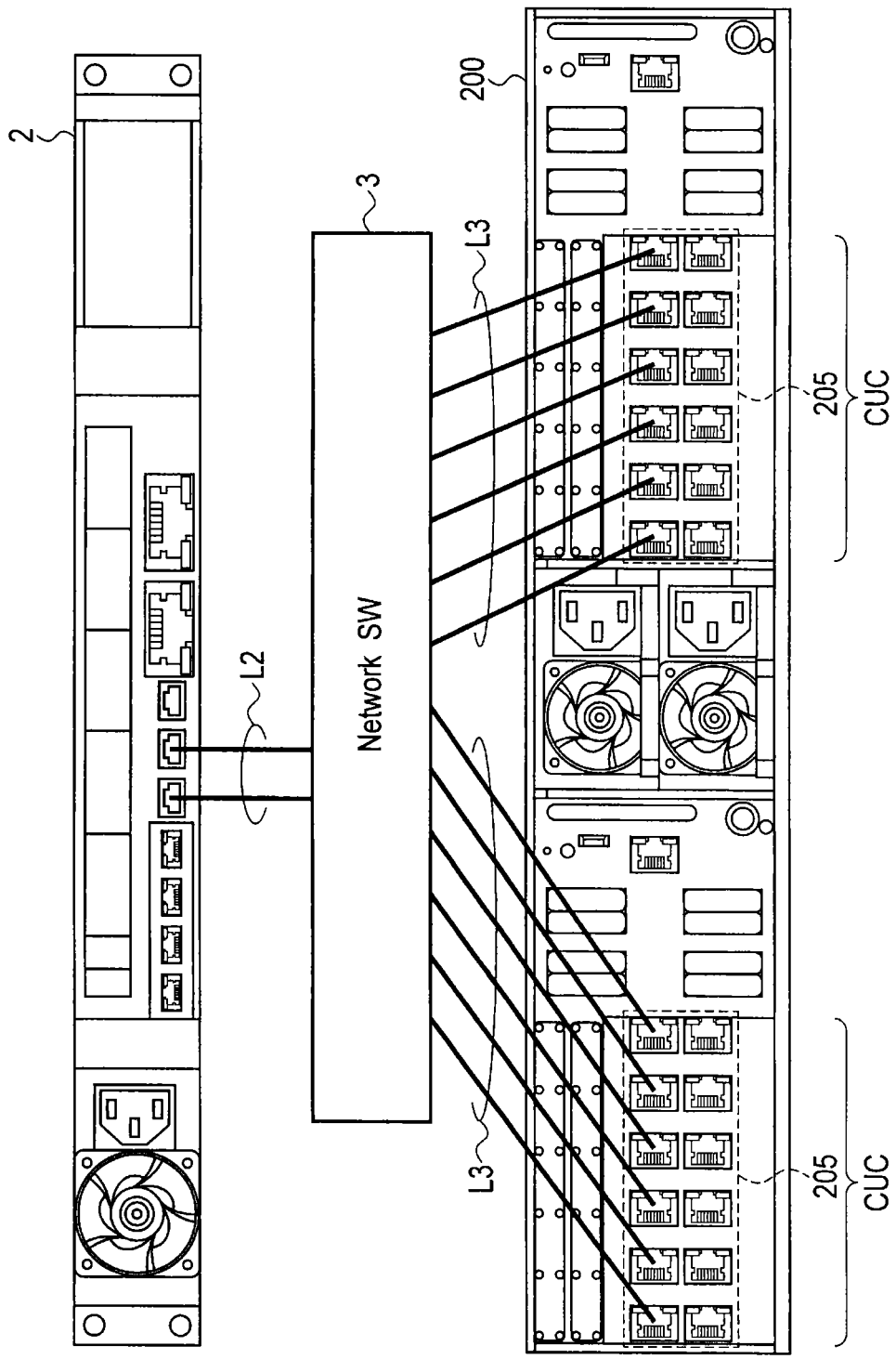
F I G. 19

NMC (One face)

NMC (Another face)

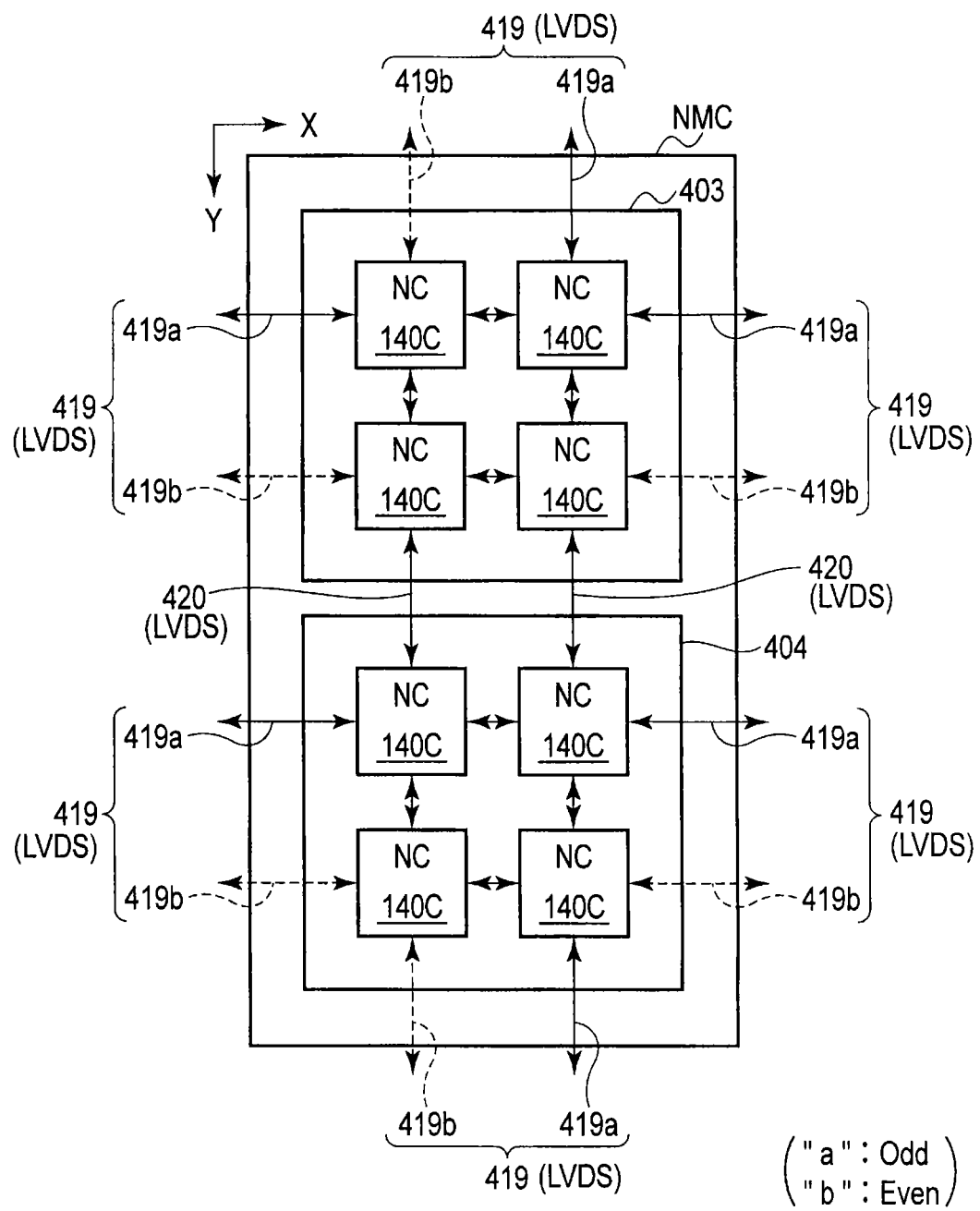
F I G. 23

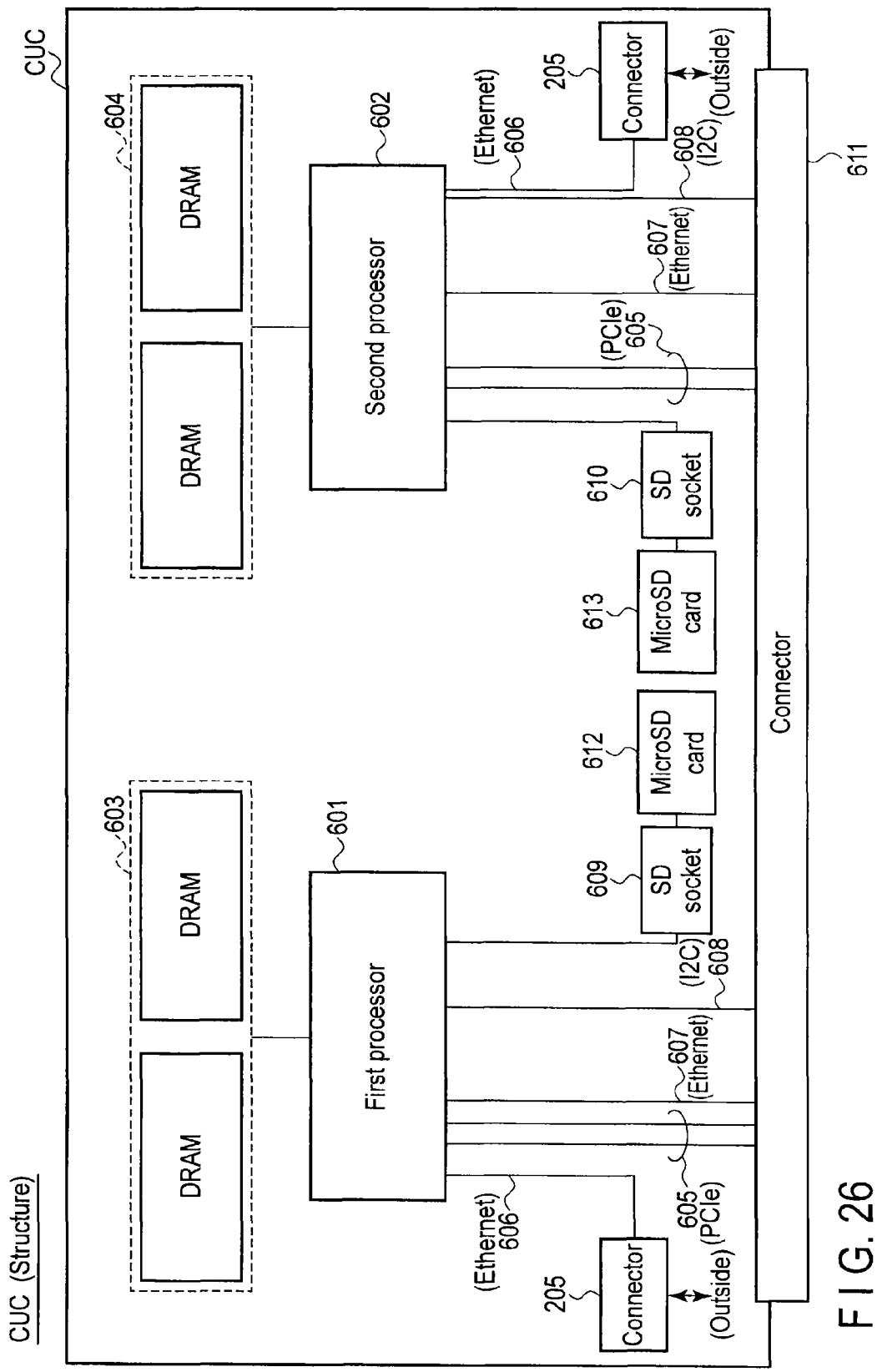
F I G. 26

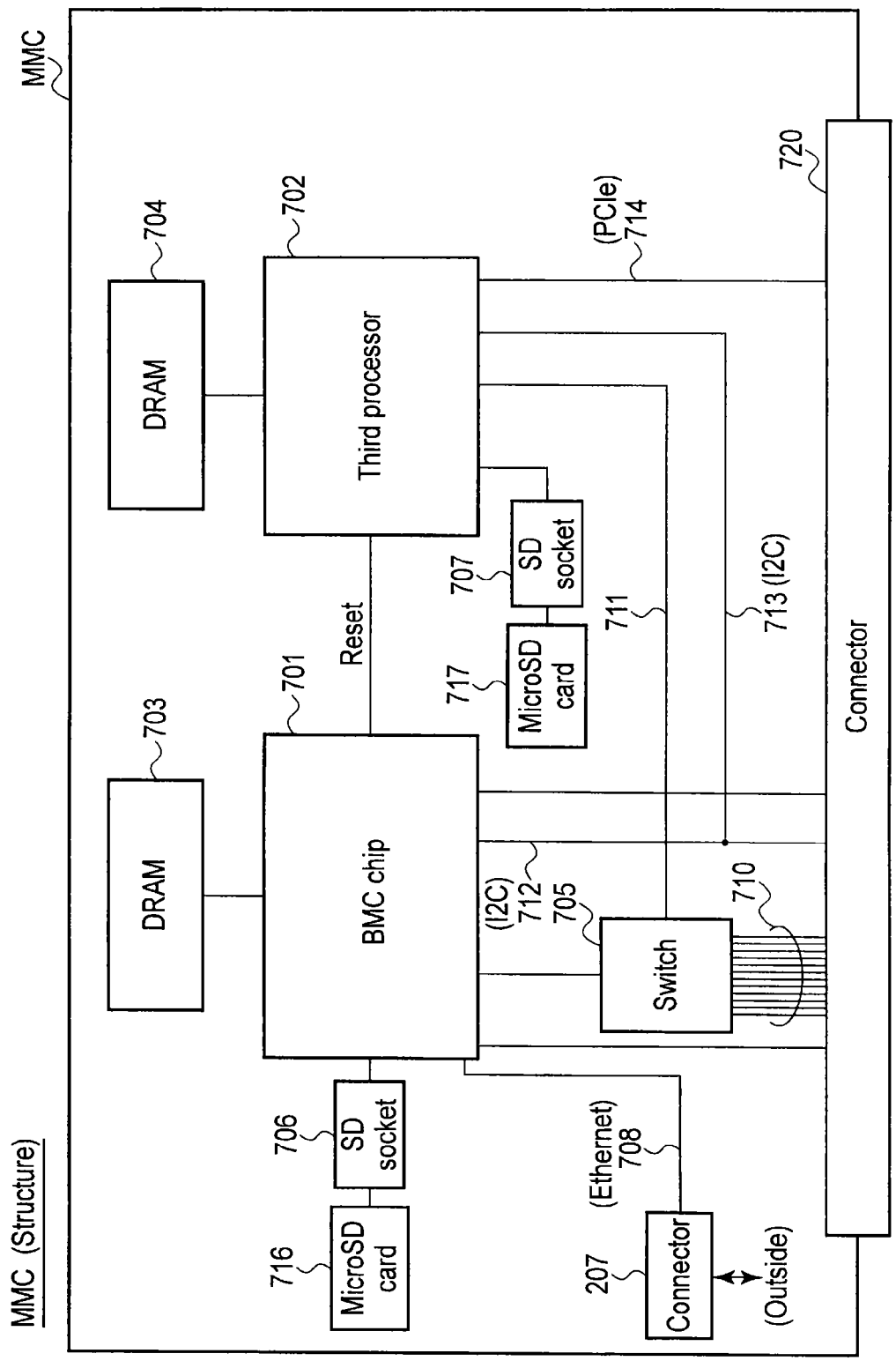
F I G. 27

Relationship in connection between CUC and MMC
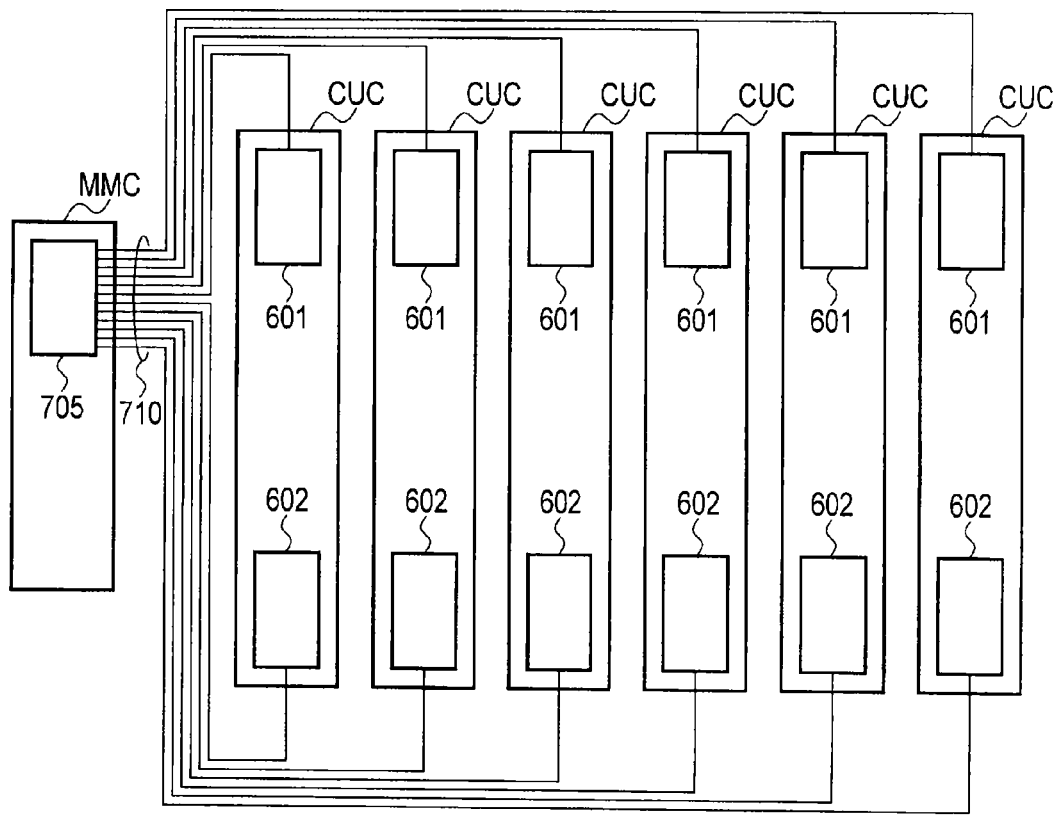
F I G. 29
First connection example
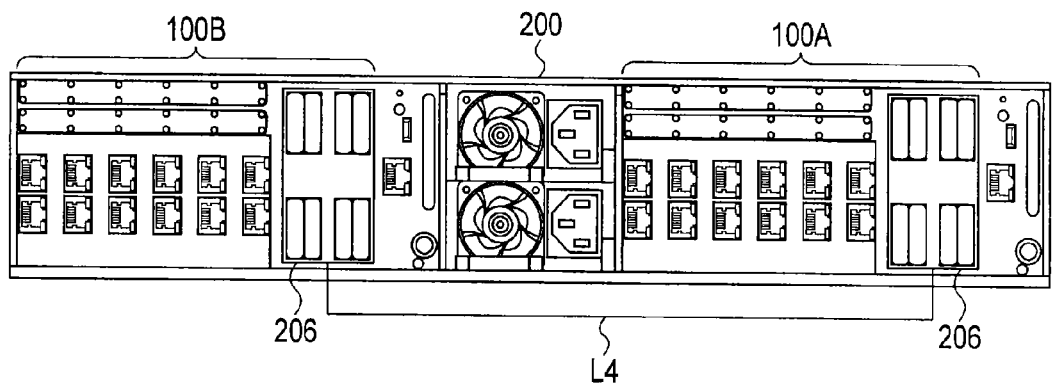
F I G. 30

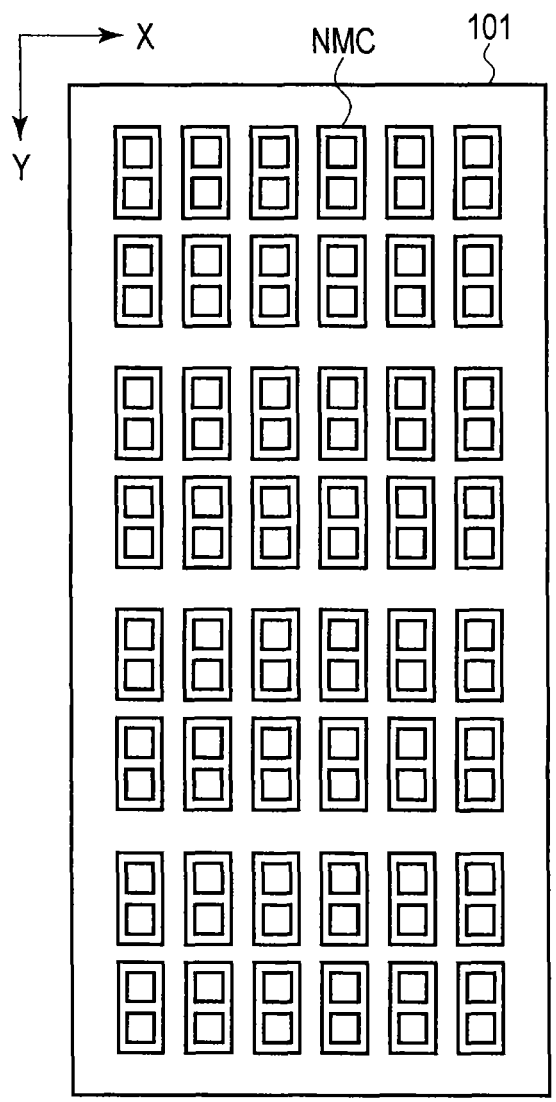
F I G. 32

STORAGE SYSTEM AND CONTROL METHOD THEREOF

CROSS-REFERENCE TO RELATED APPLICATIONS

This application claims the benefit of U.S. Provisional Application No. 62/109,432, filed Jan. 29, 2015, the entire contents of which are incorporated herein by reference.

FIELD

Embodiments relate generally to a storage system and a control method thereof.

BACKGROUND

There is a case where a plurality of information processing apparatuses including a storage system are connected to each other through a network to configure a single information processing system. As one example of the information processing system, there is a cloud computing system. In recent years, there has been an increasing tendency to make use of data such as cloud data in an information processing system.

BRIEF DESCRIPTION OF THE DRAWINGS

FIG. 2 is a block diagram showing a storage unit according to the first embodiment;
FIG. 12 is a diagram showing an example of scale-out of a storage unit according to the second embodiment;
FIG. 13 is a perspective view showing a server rack capable of mounting an enclosure enclosing a memory system according to the second embodiment;
FIG. 19 is a view showing an example of a form of use of the enclosure;
FIG. 23 is a diagram showing a relationship in logical connection between NCs;
FIG. 26 is a block diagram showing an example of a configuration of a CU card;
FIG. 27 is a block diagram showing an example of a configuration of an MM card;
FIG. 29 is a diagram showing a relationship in connection between the CU card and MM card;
FIG. 30 is a diagram showing a connector group for use in connection example 1;
FIG. 32 is a diagram showing a storage unit constructed logically by connection example 1.

DETAILED DESCRIPTION

Figure 1:
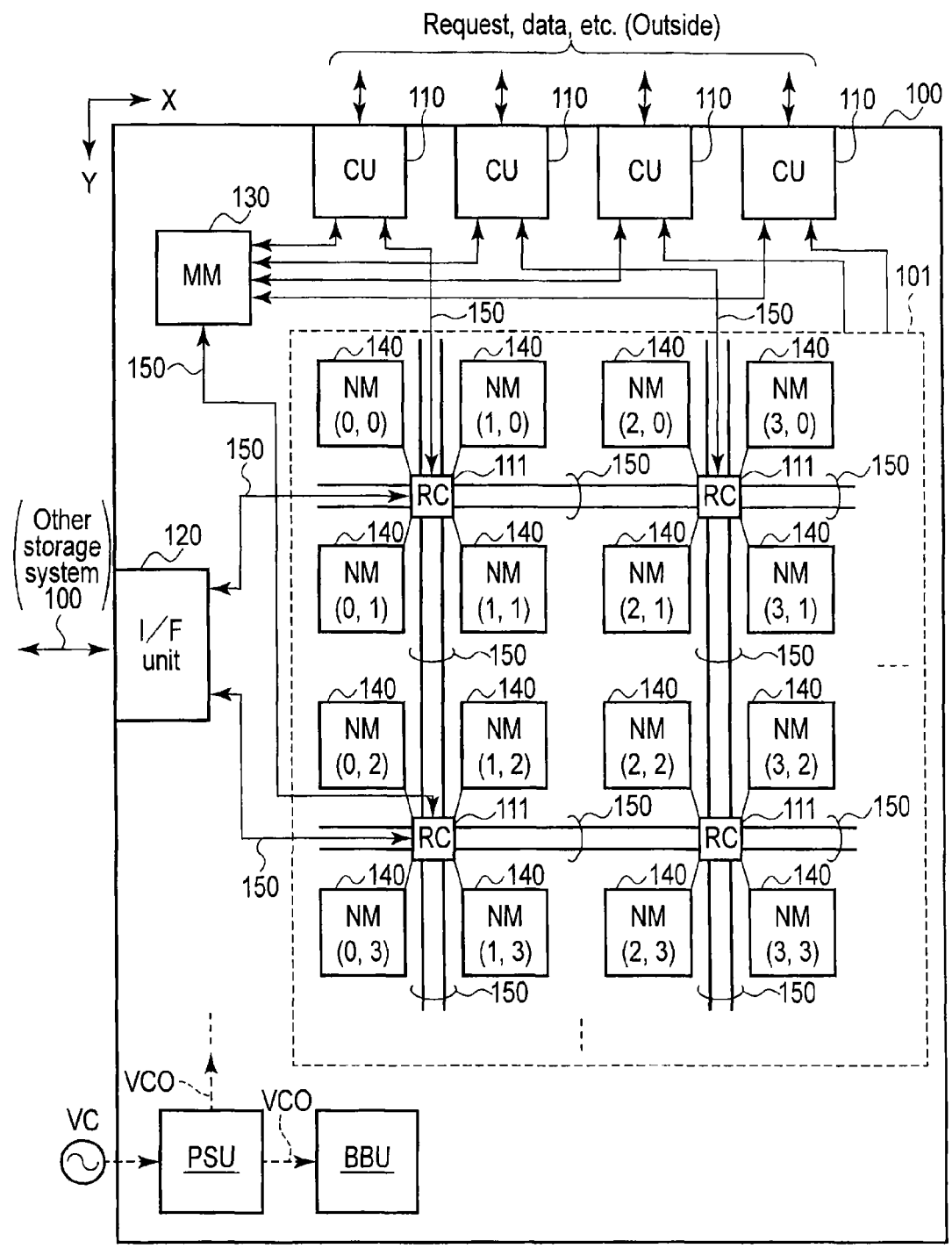
FIG. 1 is a block diagram showing a storage system according to the first embodiment.

With reference to the drawing, the embodiments of the present invention will be described below.

In the following descriptions, the same reference numeral is added to substantially the same function or element to describe it when necessary. In the specification of the present application, some elements are each given by different expressions. These expressions are merely an example and the elements can be given by other expressions. Elements that are not given by different expressions can also be given by other expressions.

Furthermore, the drawings are schematic, and the relationship between thickness and dimensions or the ratio between thicknesses of layers may be different from the actual one. The drawings may include portions that differ in the relationship in dimensions and in the ratio.

In general, according to one embodiment, a storage system includes a plurality of memory units including a nonvolatile memory and a control unit which controls the nonvolatile memory, and a routing unit which controls transfer of a packet between the memory units. The routing unit uses a partial address described in the packet and not the full address.

First Embodiment

1. Configuration

[1-1. Overall Configuration (Storage System)]

First, the overall configuration of a storage system 100 according to the first embodiment will be described briefly with reference to FIG. 1.

As shown, the storage system 100 according to the first embodiment includes a storage unit 101, connection units (CU) 110, an interface unit (I/F unit) 120, a management module (MM) 130, a power supply unit PSU and a battery backup unit BBU.

[Storage Unit]

The storage unit 101 includes a plurality of routing circuits (RC) 111 and a plurality of node modules (NM) 140, which are arranged in matrix. With this arrangement, the storage unit 101 stores data items such that they are dispersed to the plurality of NMs 140, and processes them dispersedly and parallely.

Each of the routing circuits (routing units and torus routing) 111 is configured to transfer a packet including data, which is transferred from the connection unit (CU) 110, another routing circuit 11 or the like, in a predetermined mode by means of a meshed network. The routing circuits 111 each include two or more interfaces 150. One routing circuit 111 is electrically connected to its adjacent routing circuit 111 via the interfaces 150. The routing circuits 111 will be described in detail later.

Each NM (memory unit) 140 is electrically connected to its adjacent NM 140 through a routing circuit 111 and a packet management unit (PMU) which is not shown here.

FIG. 1 shows an example of a rectangular network in which the NMs 140 are arranged at their respective lattice points. Here, the coordinates of each of the lattice points are represented by (x, y) in decimal notation. Assume that the positional information of an NM 140 located at a lattice point is represented by a relative node address $(x_D, y_D)$ (=decimal notation) which corresponds to the coordinates of the lattice point. In the example shown, the NM 140 located in the upper left corner has a node address (0, 0) of the origin. The relative node address of each NM 140 increases or decreases with variations of integral values in the horizontal direction (X direction) and vertical direction (Y direction).

Each NM 140 is connected to an NM 140 adjacent thereto in two or more different directions. For example, the NM 140 (0, 0) located in the upper leftmost corner is connected to an NM 140 (1, 0) adjacent thereto in the X direction, an NM 140 (0, 1) adjacent thereto in the Y direction different from the X direction, and an NM 140 (1, 1) adjacent thereto in the oblique direction. Hereinafter, there is a case where the NM 140 represented by the relative node address $(x_D, y_D)$ will simply be referred to as a node $(x_D, y_D)$.

In FIG. 1, the NMs 140 are shown such that they are arranged at their respective lattice points of a rectangular lattice; however, the arrangement of the NMs 140 is not limited to this example. In other words, as a form of the lattice, each NM 140 located at a lattice point has only to be connected to an NM 140 adjacent thereto in two or more different directions. For example, the form may be a triangle, a hexagon and the like. In FIG. 1, the NMs 140 are arranged in two-dimensional fashion; however, they can be arranged in three-dimensional fashion. When the NMs 140 are arranged in three-dimensional fashion, each of the NMs 140 can be designated by three values (x, y, z). When the NMs 140 are arranged in two-dimensional fashion, they can be connected in a torus fashion by connecting diagonally-arranged NMs 140 to each other. The storage unit 101 will be described in detail later.

[Connection Units (CU)]

Each of the CUs 110 includes a predetermined connector connectable to an external user, to store data in the storage unit 101 and supply data to the outside from the storage unit 101 in accordance with a request (command, address, etc.) from outside. Specifically, each of the CUs 110 includes an arithmetic unit and a storage device, which will be described later. The arithmetic unit of the CU 110 executes a server application program using the storage device as a work area.

The CU 110 processes the request from outside under the control of a server application. During the processing of the request from outside, the CU 110 gains access to the storage unit 101. When the CU 110 gains access to the storage unit 101, it generates a packet that can be transferred and executed by the routing circuits 111, and transmits the generated packet to a routing circuit 111 connected to the CU 110.

In the example of FIG. 1, the storage system 100 includes four CUs 110. The four CUs 110 are connected to different routing circuits 111, respectively.

The number of CUs 110 can arbitrarily be determined. Each of the CUs 110 can be connected to a given one of the routing circuits 111 included in the storage unit 101. One CU 110 can be connected to a plurality of routing circuits 111, and one routing circuit 111 can be connected to a plurality of CUs 110. The CU 110 can be connected to a given one of the routing circuits 111 included in the storage unit 101. The CUs 110 will be described in detail later.

[Interface Unit (I/F Unit)]

The I/F unit 120 is a connection Interface for scaling out the storage unit 101. For example, physically different two storage systems 100 can electrically be connected to each other via the I/F unit 120. With this connection, the storage units 101 of the storage systems 100 are logically coupled to each other to be used as a single storage unit 101. The I/F unit 120 is electrically connected to one or more routing circuits 111 via the interfaces 150. Here, each interface 150 connected to two routing circuits 111 is connected to the I/F unit 120.

[Management Module (MM)]

The MM 130 is electrically connected to each of the CUs 110 and a routing circuit 111. The MM 130 includes a baseboard management controller (BMC), not shown. As some of the functions of the BMC, the MM 130 monitors an environment temperature, monitors and controls the number of revolutions of a fan, monitors and controls a power supply current and a power supply voltage, records the status of each CU 110, monitors the temperature of each CU 110, resets the CU 110, and the like.

In addition to the functions of the BMC, the MM 130 performs a process (NM control process) for the storage unit 101. The NM control process is arbitrarily performed. If, for example, a first memory 141, described later, is a NAND type flash memory, the MM 130 may perform wear leveling of the first memory 141. When trouble of the NM 140 is found, the MM 130 may notify the outside that a card board on which the troubled NM 14 is mounted should be replaced, through the CU 110. The MM 130 may also rebuild RAID, described later, after the card board is replaced.

Node controllers (NC) 140C, described later or CU 110 may detect trouble of the NM 140. The detection of trouble of the NM 140 can be performed based upon detection of an error of read data from the first memory 141 included in the NM 140. When the MM 130 performs a process for the storage unit 101, it issues a packet corresponding to the process. The MM 130 issues a packet that conforms to, for example, the pattern shown in FIG. 2, described later.

[Power Supply Unit (PSU)]

The power supply unit (main power supply section) PSU converts an external power supply voltage, which is supplied from an external power supply VC, into a predetermined DC voltage, and supplies a power supply voltage VCO corresponding to the DC voltage to the foregoing units and module (101, 110, 120, 130). The external power supply VC is an AC power supply of, e.g., 100 V and 200 V. The storage system 100 according to the first embodiment includes two power supply units PSU-1 and PSU-2 (not shown). However, the arrangement of the power supply units PSU is not limited to this.

[Battery Backup Unit (BBU)]

The battery backup unit (battery unit, battery backup section) BBU receives a power supply voltage VCO from the power supply unit PSU and stores it therein. When the storage system 100 is electrically shut off from the external power supply VC, the battery backup unit BBU serves as an auxiliary power supply which supplies a given auxiliary power supply voltage to the units and module (101, 110, 120, 130). For example, even though a power failure occurs to stop supplying a power supply voltage from the external power supply VC, the battery backup unit BBU supplies an auxiliary power supply voltage to the foregoing units and module to operate the storage unit 101. Then, the node controllers (NC) 140C, which are included in the NM 140 and not shown, back up user data to be protected by writing the user data to the first memory 141 (data copy) using the supplied auxiliary power supply voltage.

[Interface Standard]

In the first embodiment, the following standards can be applied to the interfaces via which the foregoing units and module are electrically connected.

First, for example, a low voltage differential signaling (LVDS) standard is applied to an interface 150 via which the routing circuits 111 are connected to each other.

For example, a PCI Express (PCIe) standard is applied to an interface 150 via which the routing circuit 111 and the CU 110 are electrically connected to each other.

For example, the above LVDS standard and a joint test action group (JTAG) standard are applied to an interface 150 via which the routing circuit 111 and the I/F unit 120 are electrically connected to each other.

The above PICe standard and an inter-integrated circuit (I2C) standard are applied to an interface 150 via which the NM 140 and the MM 130 are electrically connected to each other.

These standards are an example, and naturally other standards can be applied when necessary.

[1-2. Configuration of Storage Unit 101]

Next, an example of the configuration of the storage unit 101 will be described with reference to FIG. 2.

As shown in FIG. 2, the storage unit 101 includes a plurality of field-programmable gate arrays (FPGA) each having one routing circuit 111 and four NMs 140. FIG. 2 shows FPGA0 to FPGA3 as an example of the four FPGA. For example, FPGA0 includes one routing circuit 111 and four NMs (0, 0), (1, 0), (0, 1) and (1, 1).

Assume that the FPGA addresses of the four FPGAs are represented by (000, 000), (010, 000), (000, 010) and (010, 010) in binary notation.

In each of the FPGAs, one routing circuit 111 and four NMs are electrically connected to each other via a packet management unit (PMU), not shown, in the interfaces 151.

The routing circuits 111 perform routing while disregarding (masking) the least significant bits BX0 and BY0 of destination addresses x and y of the FPGA addresses in the packet transfer operation. In other words, the routing circuits 111 route a packet using some of the addresses described in the packet without using all of them in the packet transfer operation.

[1-3. Configuration of FPGA]

Next, an example of the configuration of the FPGA will be described with reference to FIG. 3. Here, the configuration of FPGA0 shown in FIG. 2 will be described as one example.

Figure 3:
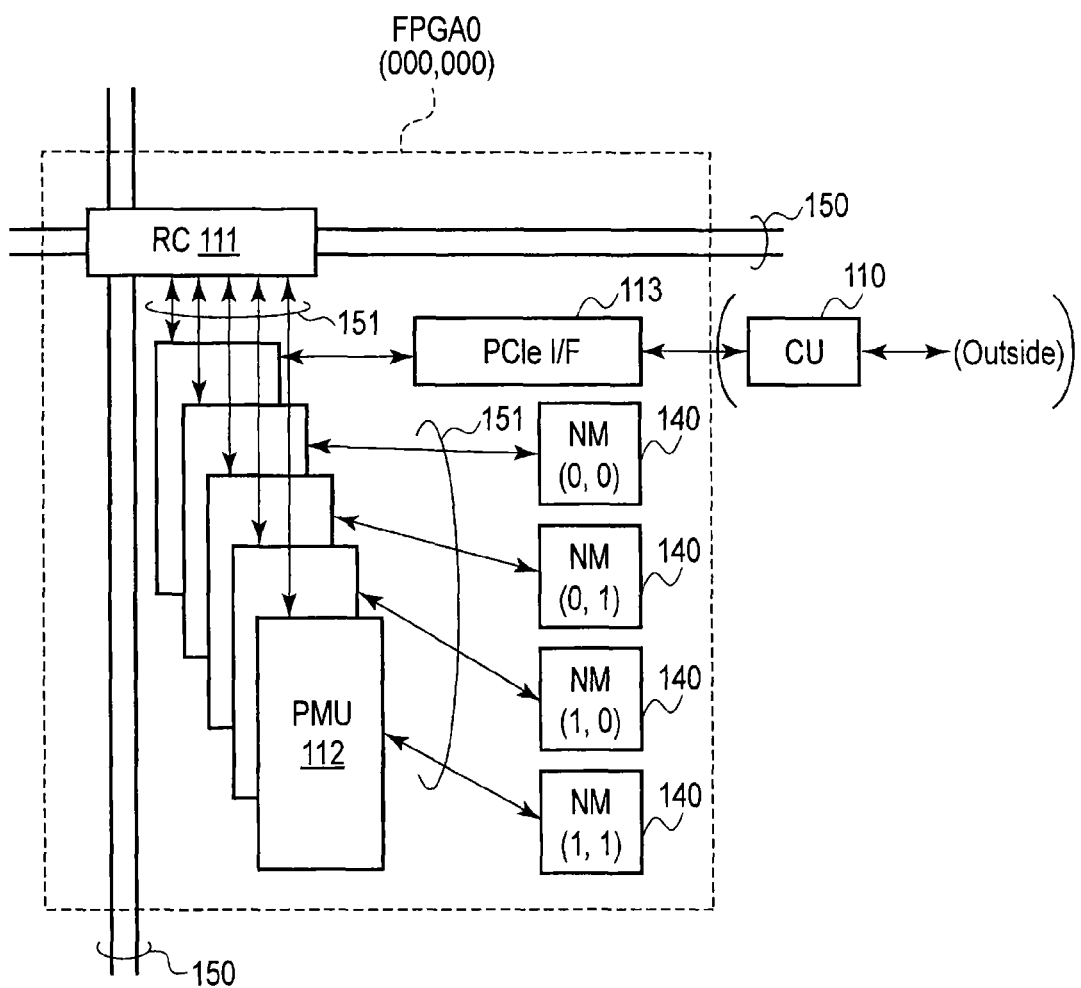
FIG. 3 is a block diagram showing an FPGA according to the first embodiment.

As shown in FIG. 3, the FPGA0 includes one routing circuit 111, four NMs 140, five packet management units (PMU) 112 and a CU interface (PCIe I/F) 113.

The PMUs 112 are provided to correspond to their respective NMs 140. Each PMU 112 analyzes a packet from the CU 110 and routing circuit 111. When the coordinates (relative node address) described in the analyzed packet coincide with those of the PMU 112, the PMU 112 transmits the packet directly to its corresponding NM 140. When they do not coincide with each other (when they are different coordinates), the PMU 112 returns a message to the routing circuit 11 as such.

When the node address of the final target position is, for example, (3, 3), the PMU 112 connected to the node address (3, 3) determines that the coordinates (3, 3) described in the analyzed packet coincide with those (3, 3) of the PMU 112. Thus, the PMU 112 connected to the node address (3, 3) transmits the analyzed packet to the NM 140 of the node address (3, 3) connected to the PMU 112. The transmitted packet is subjected to a given process based upon a request described in the packet, such as a process of storing the packet in a nonvolatile memory in the NM 140, by the node controller (NC) 140C, not shown, in the NM 140.

The CU interface (PCIe I/F) 113 analyzes, for example, a request and a packet of the CU 110 and transmits the analyzed request and packet to the PMU 112. The transmitted packet is transferred to another NM 140 through the routing circuit 111.

[1-4. Configuration of Node Module (NM)]

Figure 4:
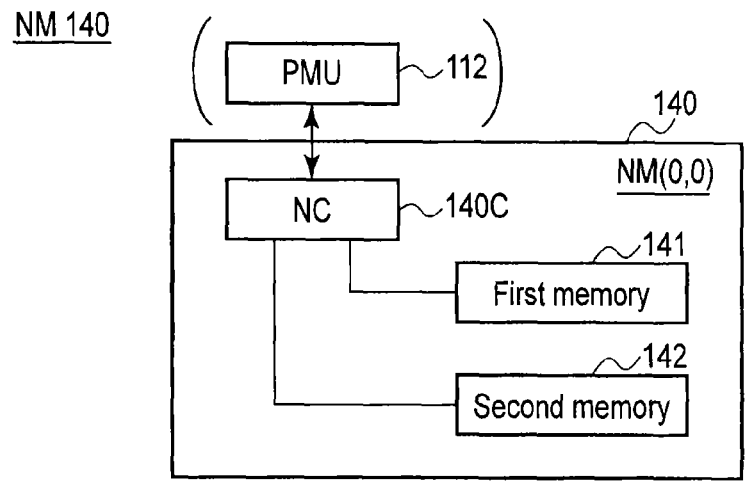
FIG. 4 is a block diagram showing an NM according to the first embodiment.

Next, an example of the configuration of the NM 140 will be described with reference to FIG. 4. Here, the configuration of NM (0, 0) 140 will be described as one example.

As shown, the NM (0, 0) 140 includes a node controller (NC) 140C, a first memory 141 serving as a storage memory, and a second memory 142 that the NC 140C uses as a work area.

The PMU 112 is electrically connected to the NC 140C. The NC 140C receives a packet from the CU 110 or another NM 140 through the PMU 112 or transmits a packet to the CU 110 or another NM 140 through the PMU 112. When the destination of a packet is the NM 140 of the NC 140, the NC 140 performs a process corresponding to the packet (command recorded on the packet). When the command is, for example, an access command (read command or write command), the NC 140C gains access to the first memory 141. When the destination of the received packet is not the NM 140 of the NC 140C, the NC 140C transfers the packet to another NM 140 connected to the NM 140 of the NC 140C.

As the first memory 141, for example, a NAND type flash memory (referred to as NAND memory hereinafter), a bit cost scalable memory (BiCS), a magnetoresistive random access memory (MRAM), a phase change random access memory (PcRAM), a resistance random access memory (RRAM (registered trademark)), or a combination of these memories can be used.

As the second memory 142, different RAMs such as a dynamic random access memory (DRAM) can be used. When the first memory 141 serves as a work area, the second memory 142 need not be provided in the NM 140.

[1-5. Packet Composition]

Next, an example of the packet composition will be described with reference to FIG. 5.

Figure 5:
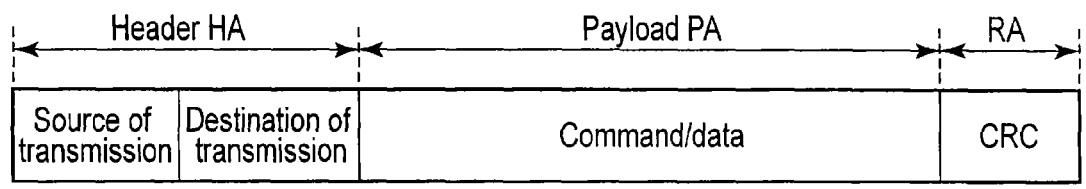
FIG. 5 is a block diagram showing a packet configuration according to the first embodiment.

As shown in FIG. 5, the packet according to the first embodiment includes a header area HA, a payload area PA and a redundant area RA.

In the header area HA, for example, the X- and Y-direction address (from_x, from_y) of a source and the X- and Y-direction address (to_x, to_y) of a destination are described.

In the payload area PA, for example, a command and data are described. The data size of the payload area PA is variable.

In the redundant area RA, for example, a cyclic redundancy check (CRC) code is described. The CRC code is a code (information) used for detecting an error of data in the payload area PA.

The routing circuit 111 that has received a packet having the foregoing composition determines a routing destination on the basis of a predetermined transfer algorithm. The routing circuits 111 according to the first embodiment perform routing while disregarding (masking) the least significant bits BX0 and BY0 of x- and y-direction addresses (to_x, to_y) of FPGA of the destination. On the basis of this transfer algorithm, the packet is transferred between the routing circuits 111 and reaches the NM 140 of the node address of the final target.

For example, each routing circuit 111 determines an NM 140 located on a route, which minimizes the number of transfers from an NM 140 of the routing circuit 111 to an NM 140 of the destination, as an NM 140 of a destination of transfer on the basis of the transfer algorithm. If there are a plurality of routes which minimize the number of transfers from an NM 140 of the routing circuit 111 to an NM 140 of the destination, the routing circuit 111 selects one of the routes by an arbitrary method. Similarly, when an NM 140 located on a route, which minimizes the number of transfers in a plurality of NMs 140 connected to the NM 140 of the routing circuit 111, is troubled or busy, the routing circuit 111 determines another NM 140 as a destination of transfer.

In the storage unit 101, a plurality of NMs 140 are logically connected to each other in a meshed network manner. Thus, there is a case where there are a plurality of routes that minimize the number of transfers of a packet in the storage unit 101. In this case, even though a plurality of packets whose destination is a specific NM 140 are issued, the issued packets are dispersedly transferred to a plurality of routes by the foregoing transfer algorithm. Accordingly, it is possible to avoid access concentration on the specific NM 140 and prevent the throughput of the entire storage system 100 from decreasing.

[1-6. Configuration of CU]

Next, an example of the CU 110 will be described with reference to FIG. 6.

Figure 6:
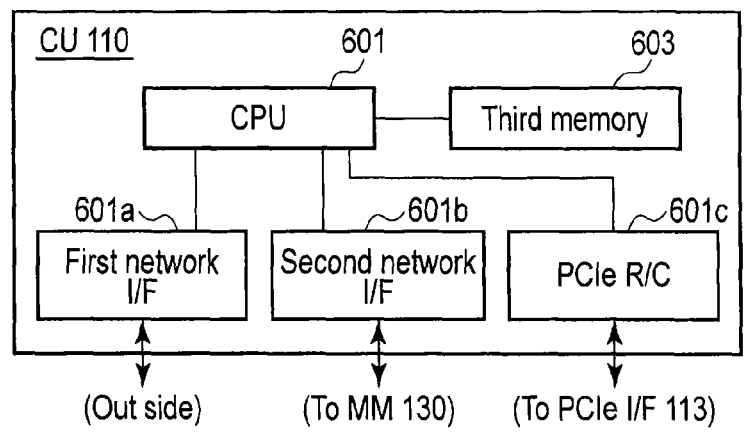
FIG. 6 is a block diagram showing a CU according to the first embodiment.

As shown in FIG. 6, the CU 110 according to the first embodiment includes a central processing unit (CPU) 601, a first network I/F 601a, a second network I/F 601b, PCIe R/C 601c and a third memory 603.

In response to a request (command, address, etc.) from outside, the CPU (control unit, arithmetic unit) 601 controls the storage unit 101 via a given connector connectable to an external user. The CPU 601 executes a server application program using the third memory 603 as a work area. Specifically, the CPU 601 processes a request from outside under the control of a server application. When the CPU 601 gains access to the storage unit 101, it generates a packet that can be transferred and executed by a routing circuit 111, and transmits the generated packet to a routing circuit 111 connected to the CU 110 of the CPU 601.

The first network I/F 601a is electrically connected to the CPU 601 and the outside of the memory system 100 via a predetermined interface.

The second network I/F 601b is electrically connected to the CPU 601 and the MM 130 via a predetermined interface.

The PCIe R/C (PCIe Root Complex) 601c serves as a bus master and is electrically connected to the CPU 601 and PCIe I/F 113 via an interface 150.

The third memory 603 is a memory used as a work area of the CPU 601. As the third memory 603, for example, a nonvolatile semiconductor memory such as a DRAM and an SRAM can be used; however, the third memory 603 is not limited to these memories.

2. Operation

[2-1. Packet Transfer Operation]

Next, a packet transfer operation of the storage system 100 according to the first embodiment will be described with reference to FIGS. 7 and 8. The operation will be described in accordance with the flowchart shown in FIG. 7.

Figure 7:
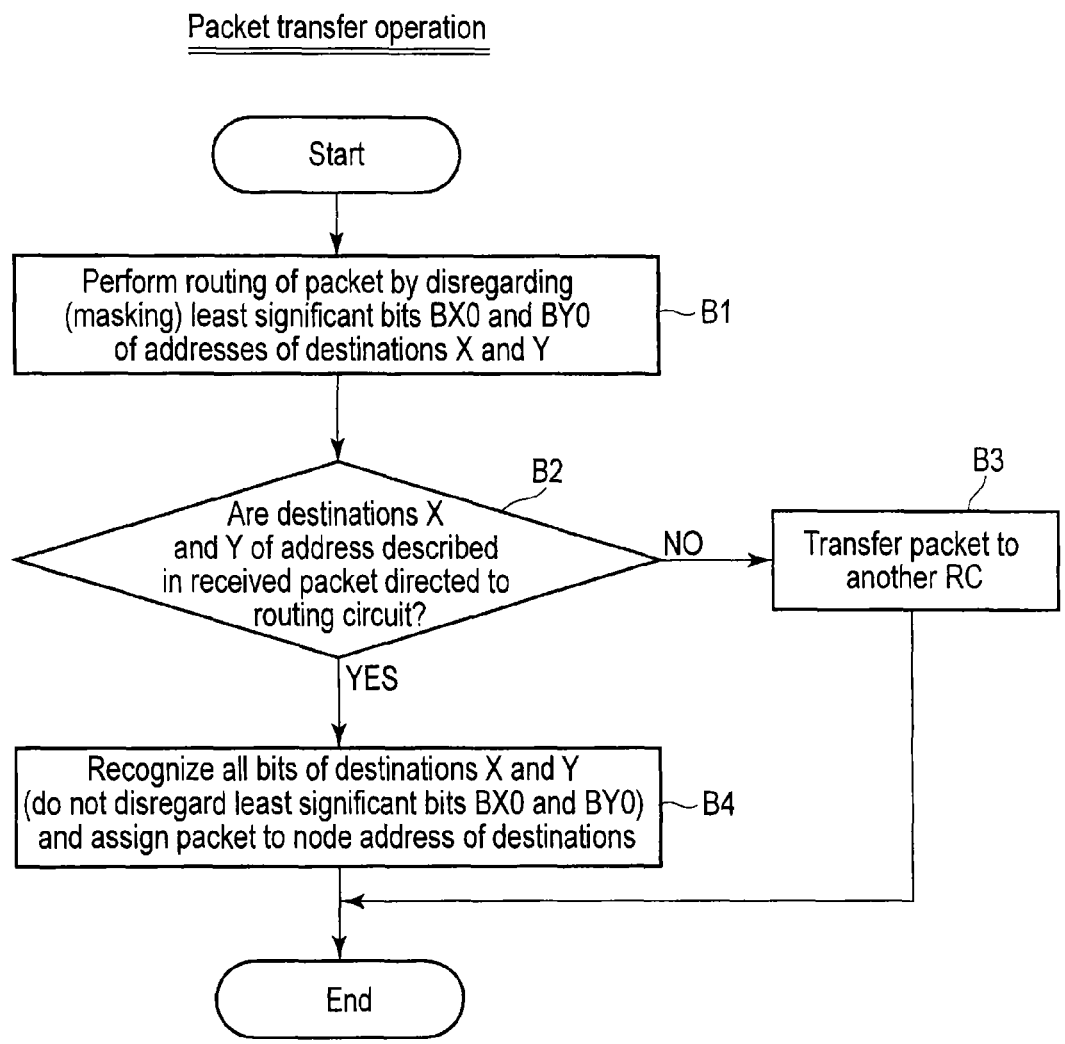
FIG. 7 is a flowchart showing a packet transfer operation of an RC according to the first embodiment.

In step B1 shown in FIG. 7, when a routing circuit 111 receives a packet from the CU 110 or another routing circuit 111, it analyzes the X- and Y-direction addresses of a destination described in the header HA of the packet. In this process, the routing circuit 111 performs routing while disregarding (masking) the least significant bits of the X- and Y-direction addresses of FPGA of the destination.

Figure 8:
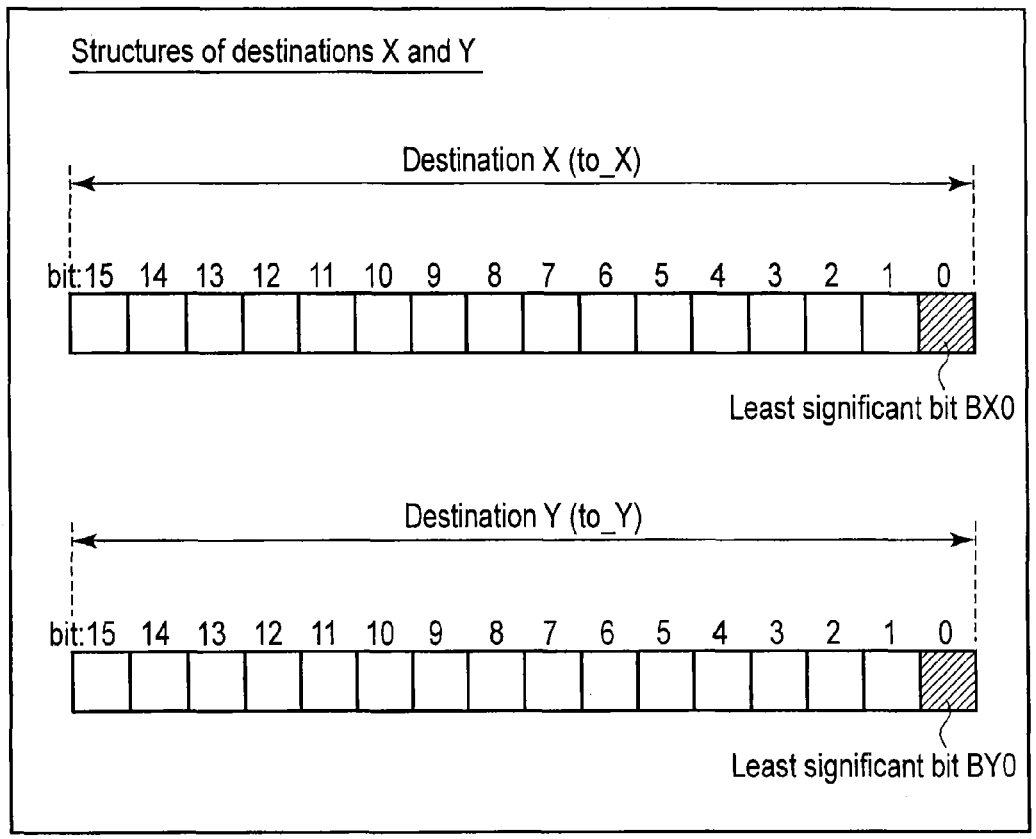
FIG. 8 is a diagram showing compositions of destination addresses X and Y according to the first embodiment.

As shown in FIG. 8, for example, the X- and Y-direction addresses (to_x, to_y) of FPGA of a destination of a packet according to the first embodiment are each described in 16 bits. In step B1, the routing circuit 111 routes the packet while disregarding the least significant bits BX0 and BY0 of the X- and Y-direction addresses (to_x, to_y) of FPGA of the destination, which are indicated by the oblique lines in FIG. 8. In other words, the routing circuit 111 routes the packet, regardless of the least significant bits BX0 and BY0 of the X- and Y-direction addresses (to_x, to_y) of FPGA of the destination.

More specifically, when the four FPGA addresses are represented by (000, 000), (010, 000), (000, 010) and (010, 010) in binary notation as shown in FIG. 2, the routing circuit 111 routes a packet while disregarding the least significant bits of the four FPGA addresses. In other words, the routing circuit 111 disregards the least significant bits of the four FPGA addresses and consequently it routes a packet on the basis of the FPGA addresses represented by (00X, 00Y), (01X, 00Y), (00X, 01Y) and (01X, 01Y). In the foregoing address notation, the bit status of each of the destination addresses X and Y is optional ("0" status or "1" status).

After that, in step B2 shown in FIG. 7, the routing circuit 111 determines whether the destination addresses X and Y of the FPGA addresses described in the received packet are directed to the routing circuit 111 itself or not. In this process, the routing circuit 111 determines whether the addresses are directed to the routing circuit 111 itself while disregarding the least significant bits BX0 and BY0 of the FPGA addresses of the destination, as described in step B1.

In step B3, when the routing circuit 111 determines that the FPGA addresses of the received packet are not directed to the routing circuit 111 (NO in B2), it transfers the packet to another RC (another routing circuit 111) in a route that minimizes the number of transfers, and this operation ends.

In step B4, when the routing circuit 111 determines that the FPGA addresses of the received packet are directed to the routing circuit 111 (YES in B2), it recognizes all the bits of the FPGA addresses of the destination and assigns the packet to the node address of an address destination in the recognized X- and Y-directions. In other words, in step B4, the routing circuit 111 relatively assigns the packet to the node address of an address destination in the recognized X- and Y-directions without regarding the least significant bits BX0 and BY0 of the FPGA address of the destination (using all of the addresses described in the packet). More specifically, the routing circuit 111 transfers the packet to the PMU 112 of the routing circuit 111, which corresponds to a target node address. The PMU 112 to which the packet is transferred assigns the packet to the NM 140 of a target node address, and this operation ends.

3. Advantageous Effects

As has been described above, at least the following advantageous effects (1) and (2) can be obtained from the configuration and operation of the storage system 100 according to the first embodiment.

(1) The number of transfer steps of a packet can be reduced.

This advantageous effect will be described by comparing the first embodiment with a comparative example.

A) Comparative Example

Figure 9:
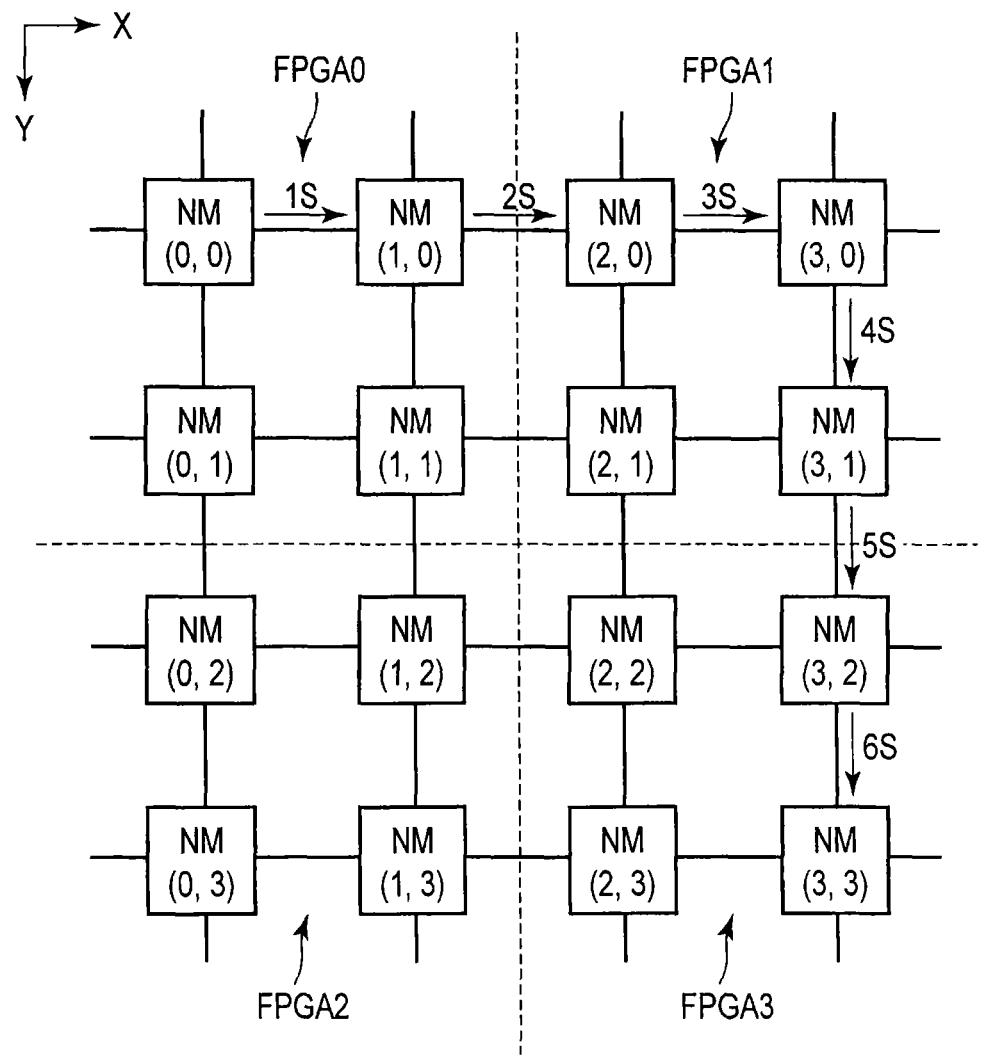
FIG. 9 is a diagram illustrating the number of transfer steps according to a comparative example.

First, a storage system according to a comparative example will be described with reference to FIG. 9. Unlike the storage system according to the first embodiment, the storage system according to the comparative example does not include a routing circuit 111, as shown in FIG. 9. Thus, a packet according to the comparative example is transferred between NMs directly without using a routing circuit 111. In the packet transfer operation, therefore, the packet is not routed by disregarding the least significant bits BX0 and BY0 of X- and Y-direction addresses (to_x, to_y) of FPGA of a destination. In other words, a storage unit according to the comparative example routes a packet on the basis of all the X- and Y-direction addresses of FPGA of a destination.

If, for example, a packet is transferred from a node address (0, 0) to a node address (3, 3) as shown in FIG. 9, the number of transfer steps should be six (1S to 6S) in total along a route that minimizes the number of transfers of the packet. Specifically, a packet is transferred directly through an NM on a route represented by the node addresses: (0, 0)→(1, 0)→(2, 0)→(3, 0)→(3, 1)→(3, 2)→(3, 3).

No packet can be transferred along a route in a diagonal direction (e.g., node addresses: (0, 0)→(1, 1)→(2, 2)→(3, 3) like a shortcut.

Thus, the storage system according to the comparative example increases in the number of transfers of a packet. For example, when the transfer distance between a CU and an NM is long, the number of transfer steps increases further. The increase in the number of transfer steps may cause latency to increase.

B) First Embodiment

In contrast to the comparative example, each of the FPGAs of the storage unit 101 of the storage system 100 according to the first embodiment includes one routing circuit 111, four NMs 140, five packet management units (PMU) 112 and a CU interface (PCIe I/F) 113.

In the foregoing configuration, the routing circuit 111 performs routing while disregarding (masking) the least significant bits BX0 and BY0 of x- and y-direction addresses (to_x, to_y) of FPGA addresses of a destination. In other words, the routing circuit 111 transfers a packet, regardless of the least significant bits BX0 and BY0 of the X- and Y-direction addresses (to_x, to_y) of FPGA of a destination. In the packet transfer operation, the routing circuit 111 routes a packet using some of the addresses described in the packet and not all of the addresses.

On the basis of the foregoing transfer algorithm, the packet is transferred between routing circuits 111 and reaches the NM 140 of the node address of the final target.

A case where a packet is transferred from a node address (0, 0) (=binary notation: (000, 000)) to a node address (3, 3) (=binary notation: (011, 011)) in the same fashion, as shown in, e.g., FIG. 10, will be described as one example. In this case, the number of transfer steps can be reduced to three (1S to 3S) in total along a route that minimizes the number of transfers of a packet.

(1S)

First, each routing circuit 111 performs routing while disregarding the least significant bits BX0 and BY0 of x- and y-direction FPGA addresses of FPGA addresses of a destination (B1). Thus, the routing circuit 111 routes a packet on the basis of each of the FPGA addresses (00X, 00Y) to (01X, 01Y) unless the address described in the packet is directed to the routing circuit 111.

When the destination of a packet is the node address (3, 3) (=binary notation: (011, 011), as shown in, for example, FIG. 10, the routing circuit 111 determines whether its FPGA address (00X, 00Y) coincides with the node address (3, 3) (=binary notation: (011, 011)) described in the packet (B2). In this process, the routing circuit 111 determines whether both the addresses coincide with each other while disregarding the least significant bits BX0 and BY0 of the FPGA address. In this case, therefore, the routing circuit 111 determines that its FPGA address (00X, 00Y) does not coincide with the node address (3, 3) (=binary notation: (01X, 01Y)) described in the packet, and transfers the packet to an adjacent FPGA1 (B3).

(2S)

Similarly, the routing circuit 111 of the FPGA1 to which the packet is transferred, determines whether its FPGA address (01X, 00Y) coincides with the node address (3, 3) (=binary notation: (011, 011)) described in the packet (B2). In this process, the routing circuit 111 determines that its FPGA address (01X, 00Y) does not coincide with the node address (3, 3) (=binary notation: (01X, 01Y)) described in the packet, and transfers the packet to an adjacent FPGA3 (B3).

(3S)

Similarly, the routing circuit 111 of the FPGA 3 to which the packet is transferred, determines whether its FPGA address (01X, 01Y) coincides with the node address (3, 3) (=binary notation: (011, 011)) described in the packet (B2). In this process, the routing circuit 111 determines that its FPGA address (01X, 01Y) coincides with the node address (3, 3) (=binary notation: (01X, 01Y)) described in the packet.

When both the addresses coincide with each other, the routing circuit 111 of the FPGA 3 recognizes all the bits of the FPGA address (3, 3) (=binary notation: (011, 011)) described in the packet, and assigns the packet to its node address of an address destination in the recognized X- and Y-directions (B4). In other words, the routing circuit 111 relatively assigns the packet to the node address of an address destination in the recognized X- and Y-directions without regarding the least significant bits BX0 and BY0 of the FPGA addresses described in the packet.

More specifically, the routing circuit 111 transfers the packet to its PMU 112 corresponding to a target node address (3, 3) (=binary notation: (011, 011)). The PMU 112 to which the packet is transferred, assigns the packet to the NM 140 of a target node address (3, 3) (=binary notation: (011, 011)) in the right obliquely downward direction. In the NM (3, 3) to which the packet is assigned, the NC 140C of the NM (3, 3) performs a desired operation, such as an operation of writing data in the packet to the first memory 141, on the basis of the command described in the packet.

As has been described above, in the packet transfer operation of the storage system 100 according to the first embodiment, each routing circuit 111 first disregards the least significant bits BX0 and BY0 and determines whether its address coincides with the address described in the packet on the basis of the addresses of the other higher-order bits (B1 to B2). When both the addresses coincide with each other, the routing circuit 111 considers all of the bits and assigns the packet to its subordinate one of the NMs 140, which corresponds to the disregarded the least significant bits BX0 and BY0 (B4).

With the above-described configuration and operation, the number of packet transfer steps can be reduced. For example, in the first embodiment, the number of packet transfer steps can be reduced to half or lower, as compared with the comparative example. Furthermore, packet communications can be carried out in a diagonal direction like a shortcut in addition to the X and Y directions (B4) and thus the number of packet transfer steps can be reduced.

(2) The packet transfer algorithm need not be changed.

As has been described above, the storage system 100 according to the first embodiment includes routing circuits 111 each of which controls packet transfers between at least two NMs (memory units) 140 together. The unit in which each routing circuit 111 controls at least two NMs 140 together, is, for example, $2^N$ (N is a natural number: 1, 2, 3, . . . ).

The routing circuits 111 each have only to perform routing while disregarding (masking) the least significant bits BX0 and BY0 in the packet transfer operation.

The storage system 100 according to the first embodiment is more advantageous than, for example, the comparative example in that the transfer algorithm, such as an address composition described in a packet, need not be changed. Therefore, the storage system 100 according to the first embodiment can decrease in manufacturing costs because any unnecessary design change need not be made.

In the storage system 100 according to the first embodiment, at least 16 NMs 140 can be controlled for one CU 110. Accordingly, at least 16 packets can be communicated for one CU 110.

(Variation)

The routing circuits 111 according to the first embodiment each disregard (mask) the least significant bits BX0 and BY0 and perform routing in the packet transfer operation. Naturally, the first embodiment is not limited to this operation as long as the node addresses of a plurality of NMs 140 are routed together.

For example, each routing circuit 111 may disregard the least significant bits and perform routing in the packet transfer operation. More specifically, each routing circuit 111 determines whether its FPGA address coincides with a node address described in a packet on the basis of an address in which the least significant bits are disregarded. When both the addresses coincide with each other, the routing circuit 111 may recognize all the bits of an FPGA address of a destination and assign the packet to the node address of an address destination in the recognized X- and Y-directions.

For example, each routing circuit 111 may disregard part of the X- and Y-direction addresses and perform routing in the same manner in the packet transfer operation. Moreover, for example, each routing circuit 111 may disregard at least one bit of the X- and Y-direction addresses and perform routing in the same manner in the packet transfer operation.

Second Embodiment

Example of Redundancy, Scale-Out, Mounting, etc

Next, a storage system 100 according to the second embodiment will be described with reference to FIGS. 11 to 32. The second embodiment is directed to, for example, redundancy, scale-out and mounting of the storage system 100. In the second embodiment, the storage system 100 is, for example, a storage system for use in a basic information processing system, such as a cloud system, which makes it difficult to stop a system operation.

Hereinafter, a detailed description of portions that overlap those of the first embodiment will be omitted. Furthermore, in the second embodiment, the routing circuits 111 arranged in a storage unit 101 are not shown in the drawings.

[Redundancy of Storage Unit]

Figure 11:
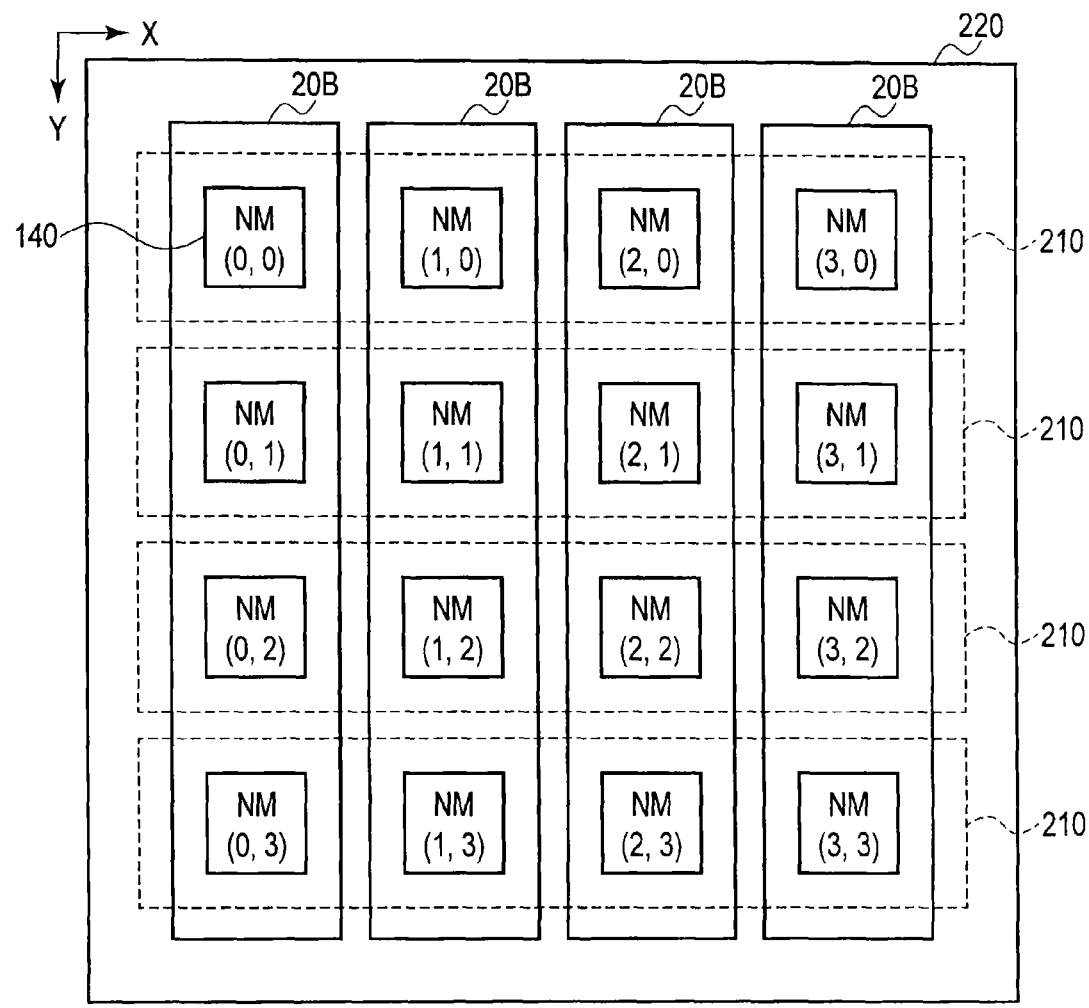
FIG. 11 is a diagram showing an example of redundancy of a storage unit according to the second embodiment.

First, an example of redundancy of the storage unit 101 will be described with reference to FIG. 11.

As shown, each NM 140 is mounted on a corresponding one of four card boards 20B. The four card boards 20B are placed on a backplane 220 via detachable connectors. Four NMs 140 are mounted on each of the card boards 20B. The four NMs 140 arranged in the Y direction are mounted on the same card board 20B, and the four NMs 140 arranged in the X direction are mounted on different card boards 20B.

In the storage unit 101, RAID (Redundant Arrays of Inexpensive Disks) can be constructed. In the example shown, four RAID groups 210 are constructed, and each NM 140 belongs to one of the four RAID groups 210. The four NMs 140 mounted on different card boards 20B constitute one RAID group 210. The four NMs 140 arranged in the X direction belong to the same RAID group 210. For example, the four NMs (0, 0), (1, 0), (2, 0) and (3, 0) arranged in the X direction belong to the same RAID group 210.

The level of RAID to be applied is optional. If RAID 5 is applied, when one of the NMs 140 that constitute a RAID group 210 is broken, a card board 20B including the broken NM 140 is replaced, with the result that data stored in the broken NM 140 is recovered. If RAID 6 is applied, data can be recovered even though two of the NMs 140 that constitute a RAID group 210 are broken.

[Scale-Out of Storage Unit]

Next, an example of scale-out of the storage unit 101 will be described with reference to FIG. 12. I/F units 120 are connection interfaces for scaling out the storage unit 101.

In the relationship in connection as shown, two storage systems 100A and 100B are connected to each other via the I/F units 120. As shown, the four NMs 140 of the storage system 100A and the four NMs 14 of the storage system 100B are connected in one-to-one correspondence via the I/F units 120.

A packet can be transferred between the two storage systems 100A and 100B via interfaces 150 connected to the I/F units 120. Thus, two storage units 101A and 101B each including a group of 4×4 NMs are logically coupled to each other, and the coupled storage units can be used as one storage unit 101 including a group of 4×8 NMs 140.

It is optional which of the NMs 140 that constitute the storage unit 101 is connected to the I/F units 120, and the number of NMs 140 connected to the I/F units 120 is optional. The variations of the relationship in connection between the storage units 101 will be described later. In the two storage units 101A and 101B, the groups of NMs 140 are directly connected to each other. More specifically, in the two storage units 101A and 101B, the groups of NMs 140 are connected to each other via routing circuits 111.

[2. Example of Mounting]

Next, an example of the above mounting configuration will be described.

[2-1. Overview]

An overview of the mounting configuration will be given with reference to FIG. 13. FIG. 13 is a view showing an enclosure 200 enclosing a storage system 100. The storage system 100 is enclosed in the enclosure 200 which can be mounted on a server rack 201.

The dimensions of the enclosure 200 depend upon the standard to which the server rack 201 conforms. Of the dimensions, the height of the enclosure 200 is expressed by 'U (unit).' For example, an enclosure 200 according to the second embodiment has a height of '2U' in the layer stack direction.

[2-1-1. Enclosure (Appearance)]

Figure 14:
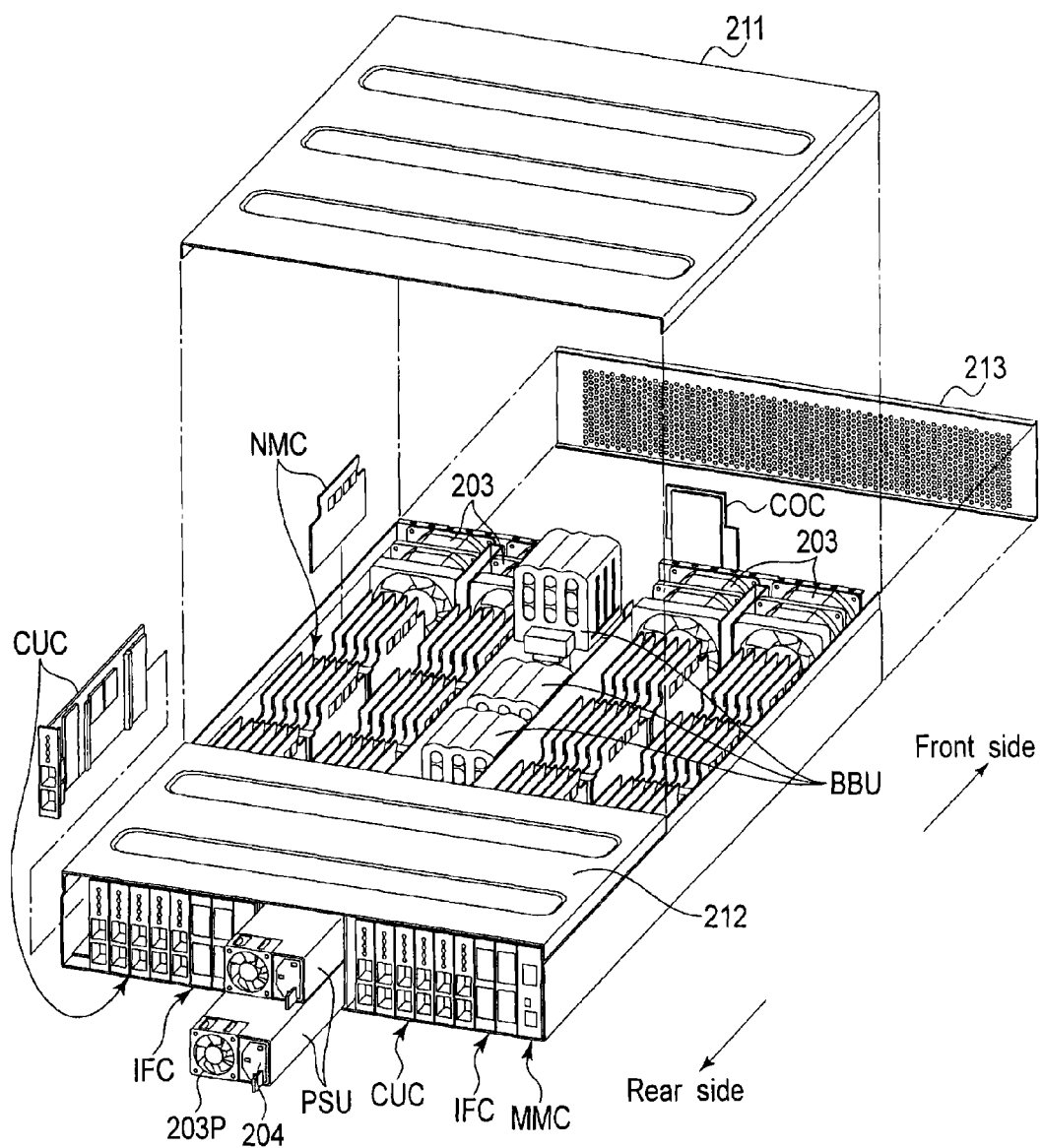
FIG. 14 is a perspective view showing an enclosure enclosing a storage system according to the second embodiment.

Next, the appearance of the enclosure 200 enclosing the storage system 100 will be described with reference to FIG. 14.

As shown, the enclosure 200 includes exterior components 211 to 213, node module cards (NMC), connection unit cards (CUC), interface cards (IFC), management module cards (MMC), console cards (COC), power supply units (PSU), battery backup units BBU and fans 203.

The exterior components 211 and 212 are provided to cover the foregoing components of the enclosure 200 in the layer stack direction, and fixed by a predetermined screw clamp or the like. The exterior component 213 is provided to cover the fronts of the foregoing components on the front side of the enclosure 200, and fixed by a predetermined screw clamp or the like.

The node module cards NMCs are card-like modules in which the above-described NM 140, NC 140C, routing circuit 111, PMU 112 and CU interface (PCIe I/F) 113 are mounted on given card boards (circuit boards). The NMCs are attached to their respective predetermined connectors on a backplane 220 in the enclosure 200, and arranged in rows and supported in an upright position and substantially in a vertical direction. The NMCs are electrically connected to each other to configure a storage unit 101.

The connection unit cards CUCs are card-like modules in which the above connection units CU are mounted on given card boards. The CUCs are arranged in rows, and each of them is enclosed in the enclosure 200 substantially in the horizontal direction from the rear side and connected to a connector. The CUCs can electrically be connected to each other via the connectors.

The interface cards IFC are each a card-like module configured by mounting the I/F unit 120 on a given card board. The IFCs are arranged in rows and each enclosed in the enclosure 200 substantially in the horizontal direction from the rear side and attached to a connector. The IFCs can electrically be connected to each other via a connector.

The management module cards MMCs are each a card-like module configured by mounting the management module 130 (MM) on a given card board. The MMCs are arranged in rows and each enclosed in the enclosure 200 substantially in the horizontal direction from the rear side and attached to a connector. The MMCs can electrically be connected to each other via a connector.

The console cards COC include a display unit such as a display and an input/output unit such as a keyboard to input/output data to/from the foregoing structural components. The COCs are arranged on the surface of the enclosure 200 on the front side.

As described above, the power supply units PSU convert an external power supply voltage, which is supplied from an external power supply VC through a power supply connector 204, to a predetermined DC voltage, and supplies the converted power supply voltage VCO to the structural components. The two power supply units PSUs are enclosed in the enclosure 200 from the rear side. Each of the power supply units PSUs includes a given fan 203P. The fan 203P is operated to make it possible to supply air and radiate heat generated by the conversion or the like.

The battery backup units BBU are arranged substantially in the middle of the enclosure 200. Here, an example where three battery backup units BBU are arranged is given. As described above, upon receiving a power supply voltage VCO from the power supply units PSU, the battery backup units BBU stores electricity. Then, the battery backup units BBU serve as auxiliary power supplies for supplying a given auxiliary power supply voltage to each of the foregoing structural components when the power supply units are electrically shut off from the external power supply VC.

Eight fans 203 are arranged on the front side of the enclosure 200 and more specifically two fans are arranged for each of the four columns. Each of the fans 203 can be operated to supply air to the NMCs CUCs, IFCs and MMCs, which are arranged in lines, and radiate heat generated from the structural components described above.

[2-1-2. Enclosure (Front Side)]

Figure 15:
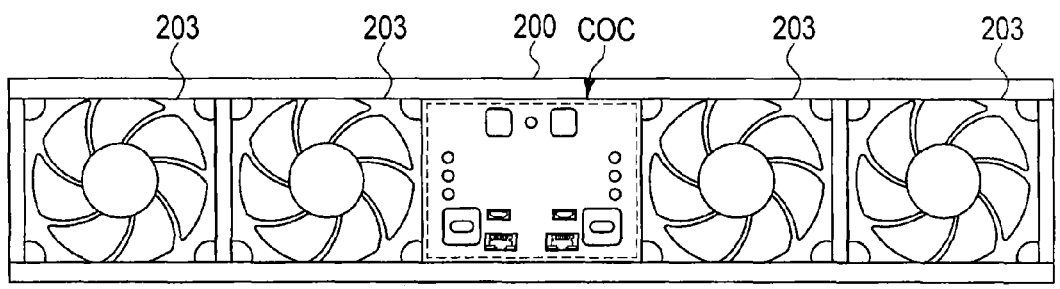
FIG. 15 is a front view of an enclosure.

Next, the appearance of the front side of the enclosure 200 will be described with reference to FIG. 15.

As shown, a COC is provided in the middle of the front side of the enclosure 200. The COC includes a power button, different LEDs and different connectors. Two fans 203 are provided on each of the right and left sides of the COC to inhale or exhale air.

[2-1-3. Enclosure (Rear Side)]

Figure 16:
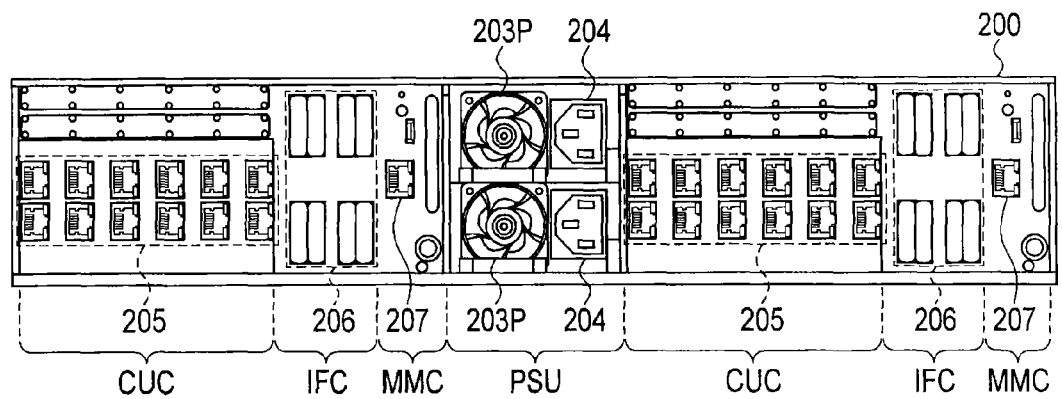
FIG. 16 is a rear view of the enclosure.

Next, the appearance of the rear side of the enclosure 200 will be described with reference to FIG. 16. Two power supply units PSU are provided in the middle of the rear side of the enclosure 200. Each of the power supply units PSU includes a fan 203P for cooling the power supply unit PSU and a power supply connector 204.

On each of the right and left sides of the rear side, a CUC, an IFC and an MMC are provided.

The CUC includes six pairs of connectors, or twelve connectors 205 in total, through which the CUC is connected to the outside. As an example of the standard of the connectors 205, a connector that conforms to the Ethernet (registered trademark) standard will be described. An optional standard can be adopted as that of the connectors 205 if the standard allows a network connection.

The IFC includes four pairs of connectors, or eight connectors 206 in total, through which the IFC is connected to the outside (another enclosure). An optional standard can be adopted as that of the connectors 206. Assume here that the above LVDS is adopted as the interfaces 150 between NMs 140, and the LVDS is adopted as the standard of the connectors 206.

The MMC includes one connector 207 through which the MMC is connected to the outside. An optional standard can be adopted as the standard of the connectors 207.

[2-1-4. Enclosure (Layer Stack Side)]

Next, the appearance of the layer stack side of the enclosure 200 will be described with reference to FIGS. 17 and 18.

Figure 17:
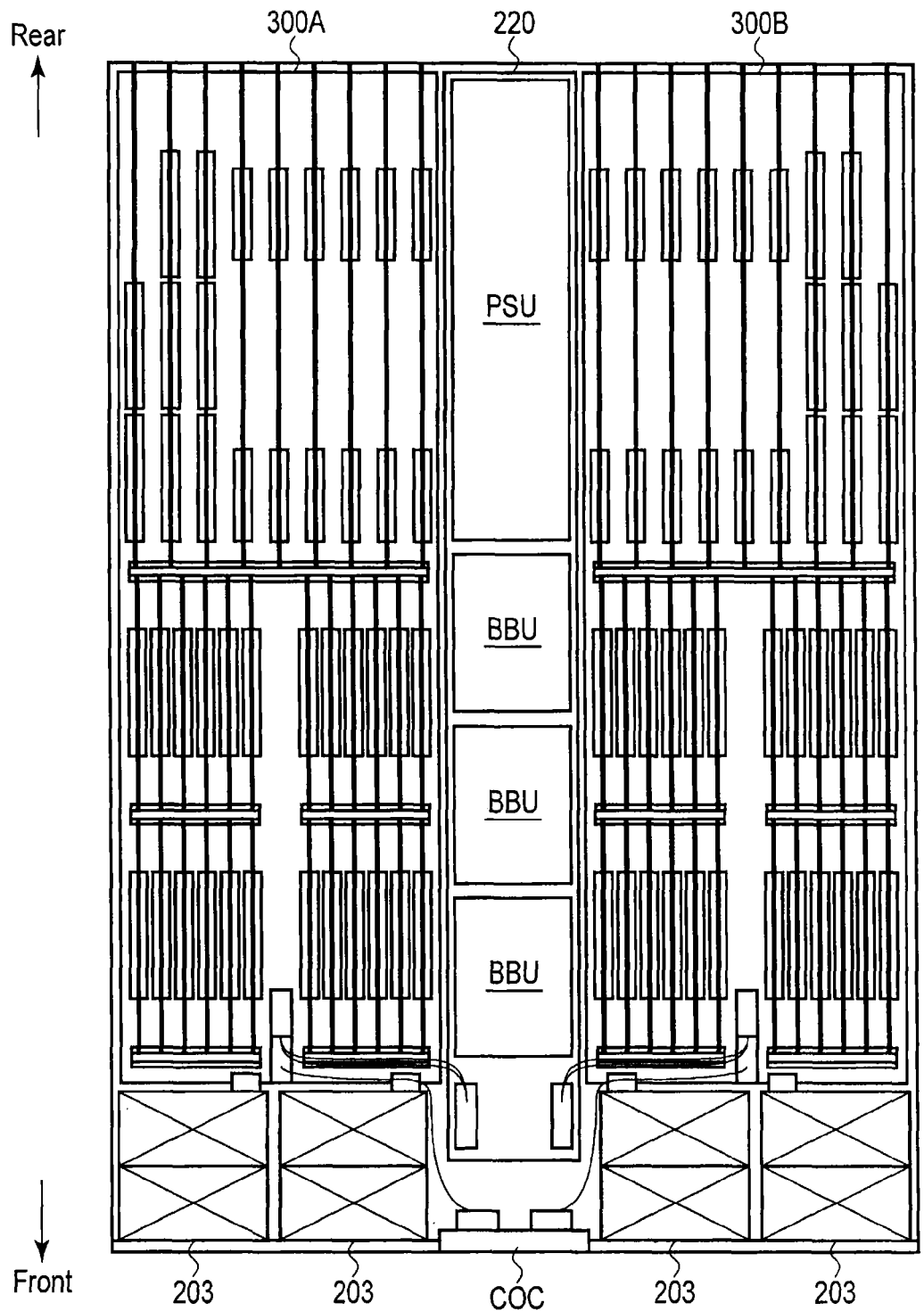
FIG. 17 is a top view of the inside of the enclosure.
Figure 18:
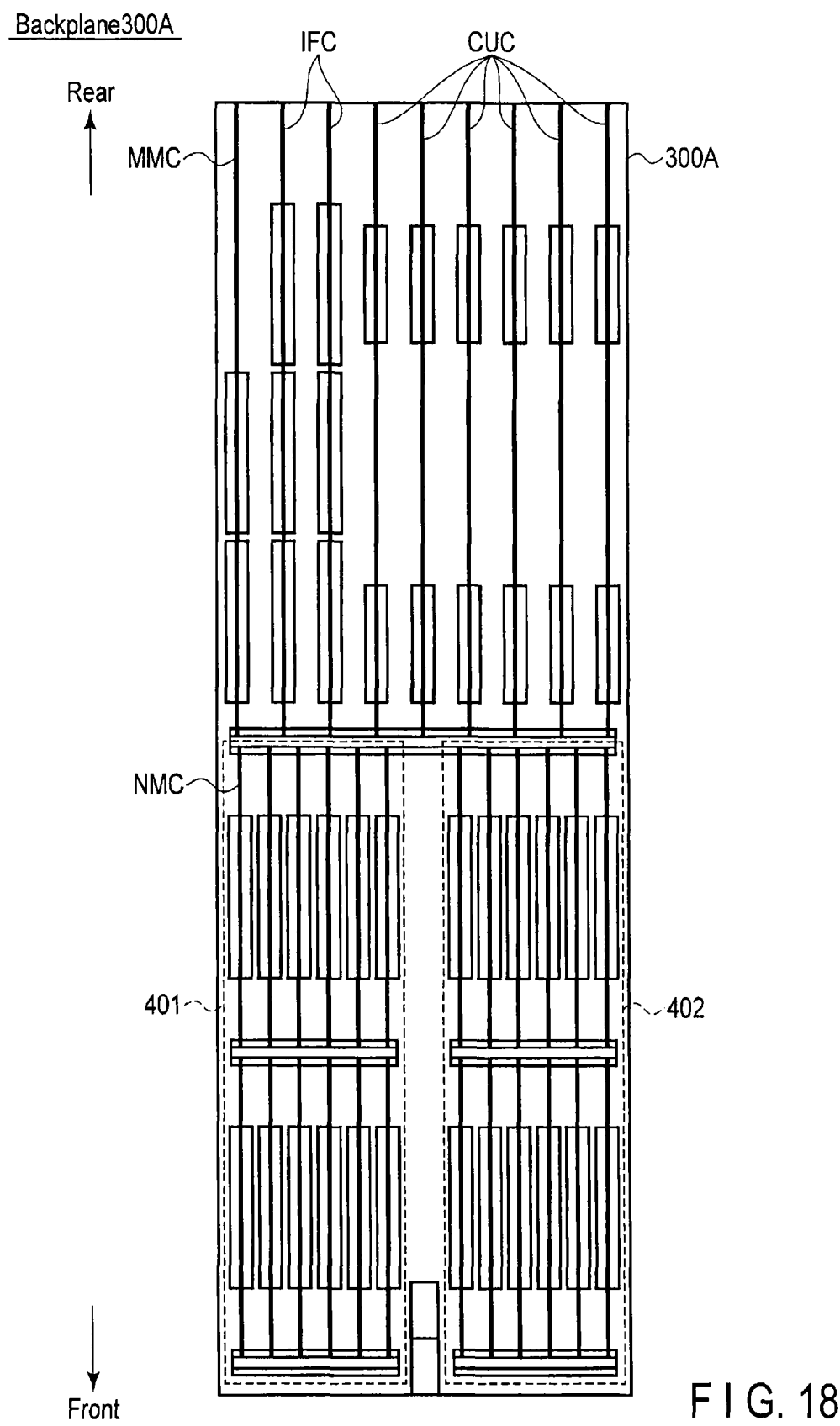
FIG. 18 is a view showing an example of a configuration of a backplane.

First, as shown in FIG. 17, a power supply backplane 210 is enclosed inside the enclosure 200 and in the middle thereof. Two backplanes 300A and 300B are enclosed in the enclosure on the left and right sides of the power supply backplane 210, respectively.

Each of the backplanes 300A and 300B is attached to a card board mounted with CUs 110, I/F units 120, MMs 130 and NMs 140. Accordingly, each of the backplanes 300A and 300B functions as one storage system 100. In other words, two storage systems 100 can be enclosed in the enclosure 200.

The enclosure 200 can be operated while enclosing one of the two backplanes 300A and 300B. When the two backplanes 300A and 300B are enclosed in the enclosure 200, they can be connected to each other through a connector 206. With this connection, the storage units 101 of the two storage systems 100 can be integrated into a single storage unit 101 and operated.

In the power supply backplane 210, the two power supply units PSU are stacked one on another in the layer stack direction (height direction) of the enclosure 200 and arranged on the rear side of the enclosure 200. Furthermore, in the power supply backplane 210, three battery backup units BBU are arranged in rows on the front side of the enclosure 200. The two power supply units PSU generate an internal power supply voltage on the basis of an external power supply voltage (commercial power supply voltage) supplied from outside via the power supply connector 204, and supply the generated internal power supply voltage to the two backplanes 300A and 300B through the power supply backplane 210. The three battery backup units BBU are backup power supplies which generate an internal power supply voltage when a supply of a commercial power supply voltage is stopped due to a power failure or the like.

Next, one backplane 300A shown in FIG. 17 will be described with reference to FIG. 18.

As shown, a CU 110, an I/F unit 120, an MM 130 and an NM 140 are mounted on the respective card boards, and these card boards are inserted into slots of the backplane 300A as a CUC, an IFC, an MMC and an NMC.

For example, one MMC, two I/FCs and six CUCs are arranged in that order from the left of the backside of the backplane 300A and attached to the backside. On the front side of the backplane 300A, twenty-four NMCs are arranged in two lines and attached to the backplane. The twenty-four NMCs are classified into a block (first block 401) including twelve NMCs on the left side of FIG. 18 and a block (second block 402) including twelve NMCs on the right side thereof. This classification is based upon the attachment positions.

[2-1-5. Example of Form of Use of Enclosure]

Next, an example of a form of use of the enclosure 200 will be described with reference to FIG. 19. FIG. 19 is a view showing an example of a form of use of the enclosure 200.

As shown, the enclosure 200 is electrically connected to a PC server 2 via connectors 205 of CUCs and a network switch (Network SW) 3 using interconnections L2 and L3.

In the above form of use, the storage system 100 enclosed in the enclosure 200 interprets a request from the PC server 2 at the CUCs and gains access to the storage unit 101. In the CUCs, a server application is executed. The PC server 2 is able to transmit a request that the server application can receive.

The connectors 205 and the network switch 3 are connected to each other for each of the CUCs. However, the enclosure is not limited to this form of use, but an arbitrary CUC can electrically be connected to the network switch 3.

[3. Relationship in Configuration and Connection Between Cards]

Next, the foregoing cards (NMC, IFC, CUC and MMC) including a storage system 100 enclosed in the enclosure 200 will be described, as will be the relationship in connection between them.

[3-1. NMC]

[3-1-1. Configuration]

Figure 20:
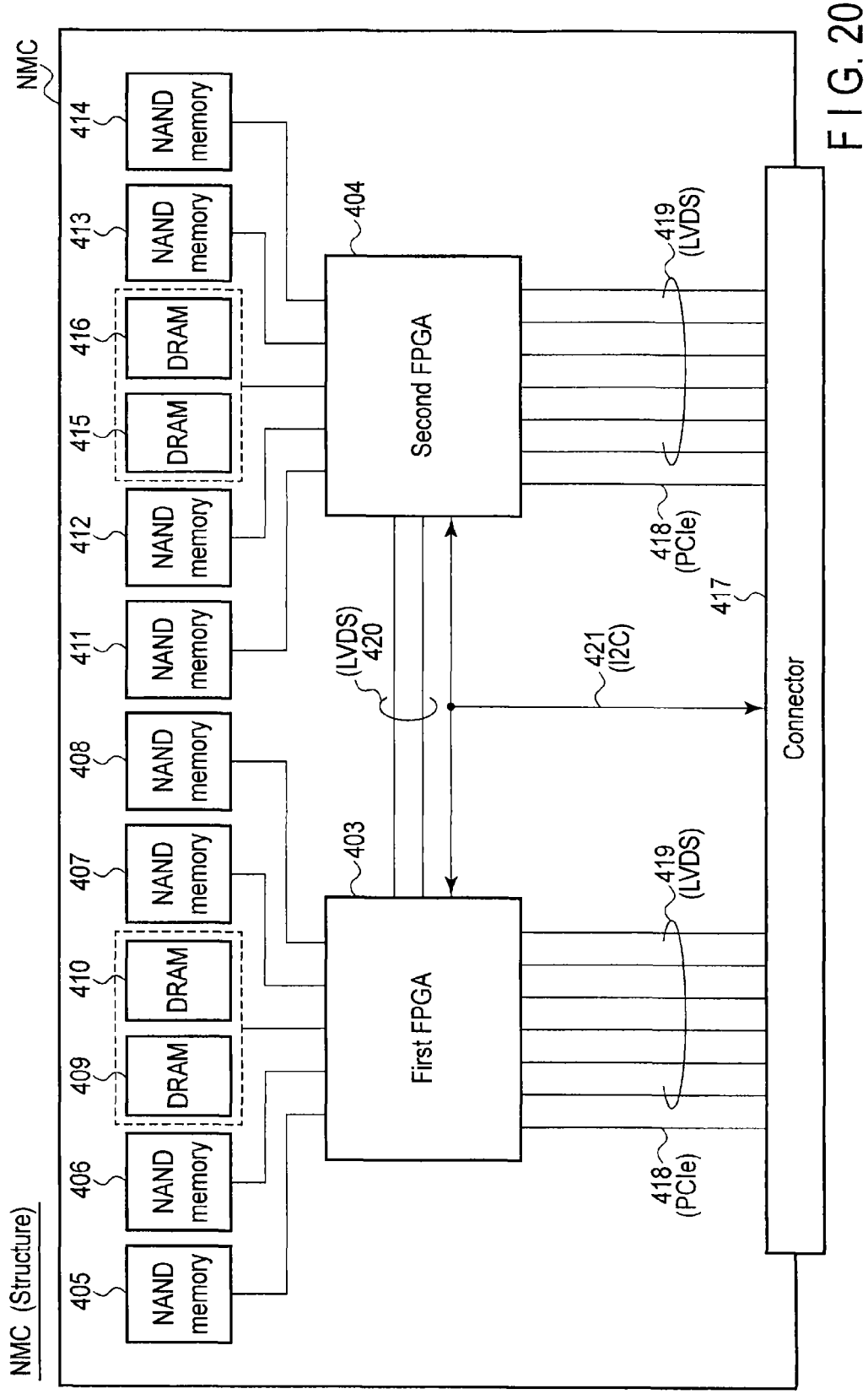
FIG. 20 is a block diagram showing an example of a configuration of an NM card.
Figure 21:
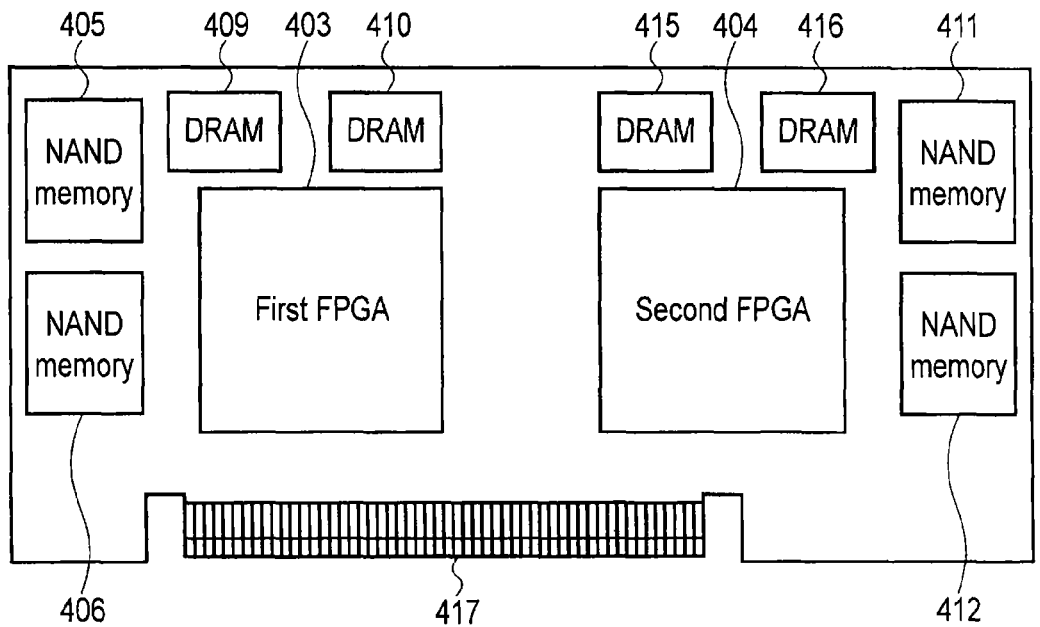
FIG. 21 is a schematic view of the NM card.
Figure 22:
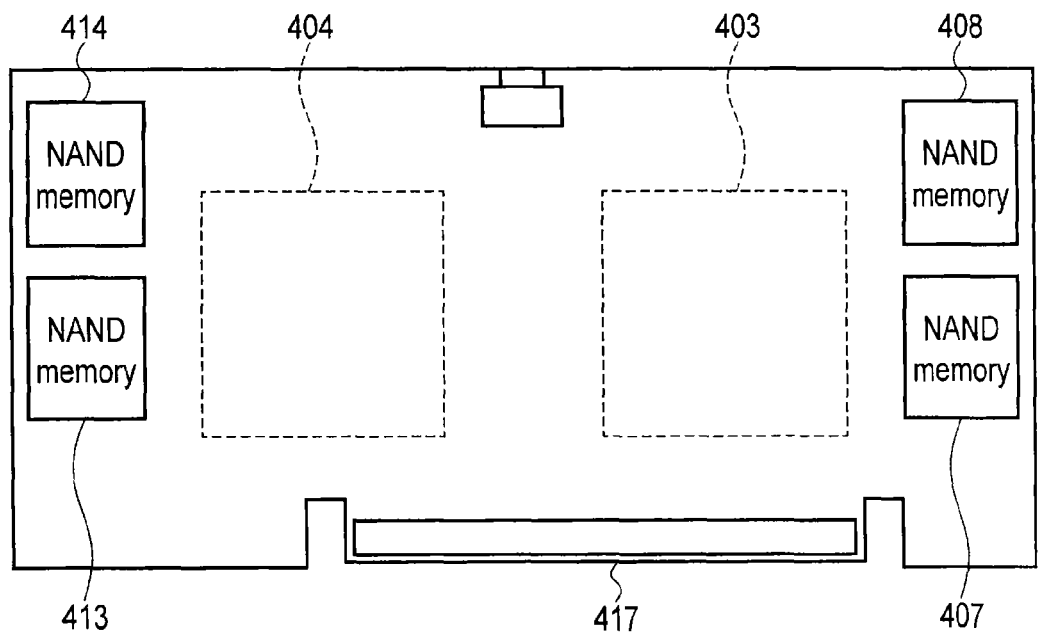
FIG. 22 is another schematic view of the NM card.

First, a configuration of an NMC will be described with reference to FIGS. 20 to 22. FIG. 20 is a block diagram showing a configuration of an NMC. FIG. 21 is a block diagram showing one surface of the NMC. FIG. 22 is a block diagram showing the other surface of the NMC.

As shown in FIG. 20, the NMC includes first and second field-programmable gate arrays (FPGA) 403 and 404, NAND memories 405 to 408 and 411 to 414, DRAMs 409, 410, 415 and 416 and a connector 417.

As shown in FIGS. 21 and 22, the first FPGA 403, NAND memories 405 and 406, DRAMs 409 and 410 and NAND memories 407 and 408 are symmetrical with the second FPGA 404, NAND memories 411 and 412, DRAMs 415 and 416 and NAND memories 414 and 415, respectively.

The connector 417 is provided in a position shifted from the center of the above symmetry. The connector 417 is a connection mechanism that is physically and electrically connected to the slots on the backplane 300. The NMC can electrically be connected to another NMC to carry out communications therewith via the connector 417 and an interconnection formed in the backplane 300.

[First FPGA]

As shown in FIG. 20, the first FPGA 403 is connected to four NAND memories 405 to 408 and two DRAMs 409 and 410. The first FPGA 403 includes one routing circuit 111, four PMUs, one CU interface 113 and four NCs 140C. The four NCs 140C included in the first FPGA 403 use the DRAMs 409 and 410 as the above second memory 142.

The four NCs 140C included in the first FPGA 403 use different NAND memories of the NAND memories 405 to 408 as the first memory 141. In other words, the first FPGA 403, NAND memories 405 to 408 and DRAMs 409 and 410 correspond to one group of NMs 140 including four NMs 140C.

[Second FPGA]

The second FPGA 404 is connected to four NAND memories 411 to 414 and two DRAMs 415 and 416. The second FPGA 404 includes one routing circuit 111, four PMUs, one CU interface 113 and four NCs 140C. The four NCs 140C included in the second FPGA 404 use the DRAMs 415 and 416 as the above second memory 142.

The four NCs 140 included in the second FPGA 404 use different NAND memories of the NAND memories 411 to 414 as the first memory 141. In other words, the second FPGA 404, flash memories 411 to 414 and DRAMs 415 and 416 correspond to one group of NMs 140 including four NMs 140C.

[Interface]

The first FPGA 403 is electrically connected to the connector 417 via one PCIe interface 418 (CU interface 113) and six LVDS interfaces 419.

Similarly, the second FPGA 404 is electrically connected to the connector 417 via one PCIe interface 418 (CU interface 113) and six LVDS interfaces 419.

The first FPGA 403 and second FPGA 404 are electrically connected to each other via two LVDS interfaces 420.

The first FPGA 403 and second FPGA 404 are electrically connected to the connector 417 via an I2C interface 421.

[3-1-2. NMC (Relationship in Logical Connection Between NCs)

A relationship in logical connection between node controllers (NC) 140C in the NMC will be described in more details with reference to FIG. 23.

As shown, each of the NCs 140C includes four interfaces in total. Each of the NCs 140C is connected to two other NCs 140 included in the same FPGA via two interfaces in the FPGA.

Specifically, two of the four NCs 140C included in the first FPGA 403 are connected to two of the four NCs 140 included in the second FPGA 404 via the LVDS interfaces 420. Since the NCs 140C are so connected, eight NMs 140 of the NMC constitute one group of NMs 140 in four rows and two columns.

The other interfaces of each NC 140C are interfaces (LVDS interfaces 419) for connecting to NCs 140C included in FPGAs on another NMC (not shown). The NCs 140C located in the four corners of an array in four rows and two columns include two LVDS interfaces 419, and the NCs 140C located on the periphery other than the four corners include one LVDS interface 419. In other words, the NMC includes twelve LVDS interfaces 419 in total.

The LVDS interfaces 419 are used for connecting the NMC to another NMC. The NC 140C located on the positive side ("X+" direction) in the X direction can be connected to the NC 140C on another NMC logically adjacent thereto in the "X+" direction. The NC 140C located on the negative side ("X−" direction) in the X direction can be connected to the NC 140C on another NMC logically adjacent thereto in the "X−" direction. The NC 140C located on the positive side ("Y+" direction) in the Y direction can be connected to the NC 140 on another NMC logically adjacent thereto in the "Y+" direction. The NC 140C located on the negative side ("Y−" direction) in the Y direction can be connected to the NC 140 on another NMC logically adjacent thereto in the "Y−" direction.

[Odd Group/Even Group]

In the second embodiment, the twelve LVDS interfaces 419 of the NMC are divided into two groups of an odd group and an even group.

Hereinafter, the LVDS interfaces 419 of the odd group will be referred to as LVDS interfaces 419a. The LVDS interfaces 419 of the even group will be referred to as LVDS interfaces 419b.

In FIG. 23, the solid lines indicate the LVDS interfaces 419a belonging to the odd group and the broken lines indicate the LVDS interfaces 419b belonging to the even group. As shown, the twelve LVDS interfaces 419 are divided in equal numbers of the odd and even groups in each of the "X+," "X−," "Y+" and "Y−" directions.

[3-2. IFC]

[3-2-1. Configuration]

Figure 24:
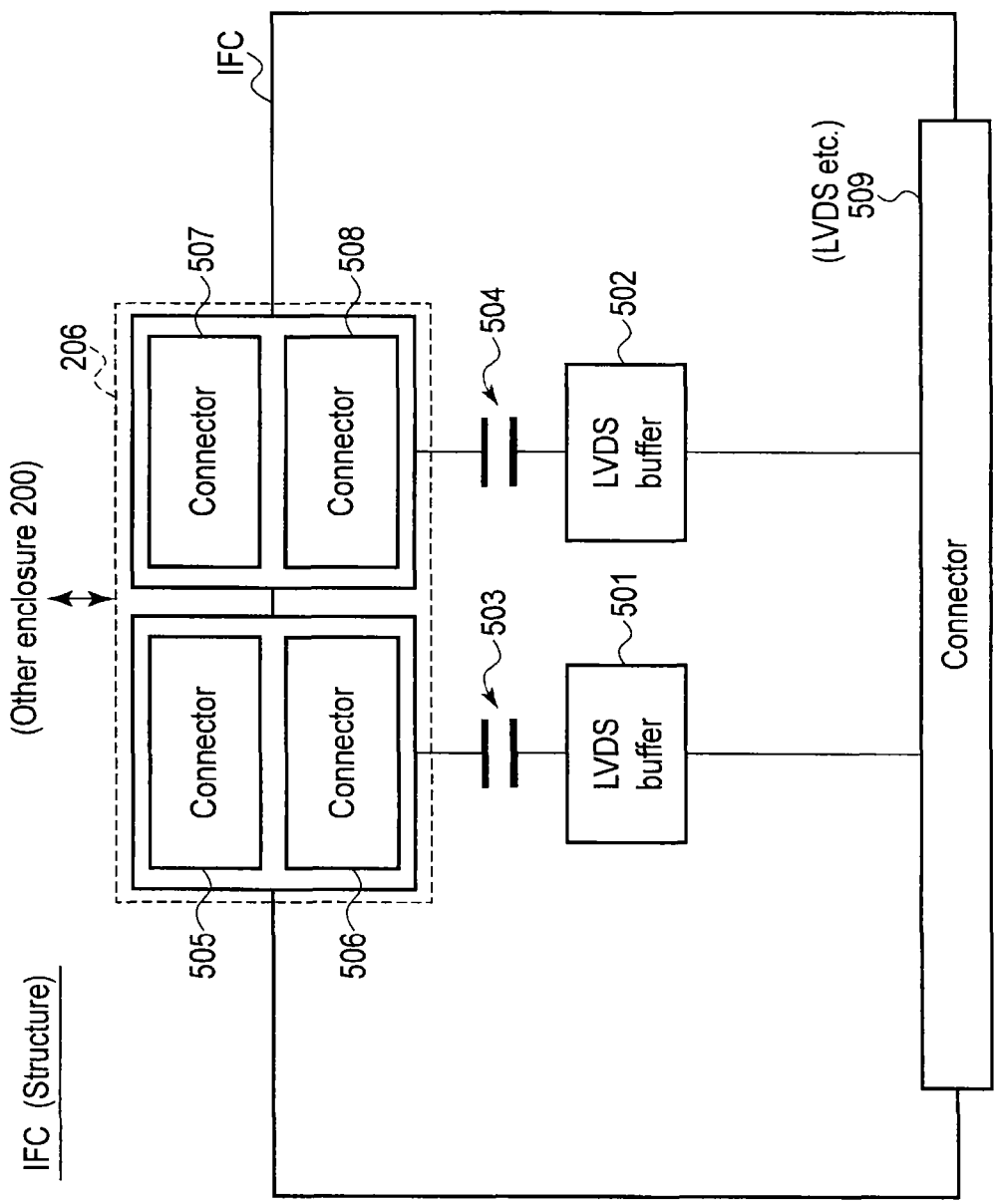
FIG. 24 is a block diagram showing an example of a configuration of an I/F card.

Next, a configuration of the IFC will be described with reference to FIG. 24. FIG. 24 is a block diagram showing a configuration of the IFC.

As shown, the IFC includes connectors 509 and 206, LVDS buffers 501 and 502 and capacitors 503 and 504.

The connector 509 is a connection mechanism that is physically and electrically connected to the slots on the backplane 300. The IFC is electrically connected to the NMC, cards and the like via the connector 509 and the interconnection on the backplane 300.

The connector 206 is a connection mechanism that is electrically connected to the storage system 100 enclosed in another enclosure 200 via another IFC, as described above. The connector 206 includes four connectors 505 to 508. The connectors 505 and 506 include a detachable mechanism and are detachable at the same time, and the connectors 507 and 508 include a detachable mechanism and are detachable at the same time.

The connector 505 is an LVDS cable connector including terminals of the "X+"-direction LVDS interfaces 419. The connector 506 is an LVDS cable connector including terminals of the "X−"-direction LVDS interfaces 419. The connector 507 is an LVDS cable connector including terminals of the "Y+"-direction LVDS interfaces 419. The connector 508 is an LVDS cable connector including terminals of the "Y−"-direction LVDS interfaces 419.

The "X+"-direction LVDS interfaces 419 and the "X−"-direction LVDS interfaces 419 are connected to the connectors 505 and 506, respectively via the connector 509, LVDS buffer 501 and capacitor 503.

The "Y+"-direction LVDS interfaces 419 and the "Y−"-direction LVDS interfaces 419 are connected to the connectors 507 and 508, respectively via the connector 509, LVDS buffer 502 and capacitor 504.

As described above, two IFCs are attached to each of the backplanes 300. One of the two IFCs attached to each of the backplanes 300 belongs to the odd group only, and the other belongs to the even group only.

[3-2-2. Relationship in Connection Between IFC and NMC]

Figure 25:
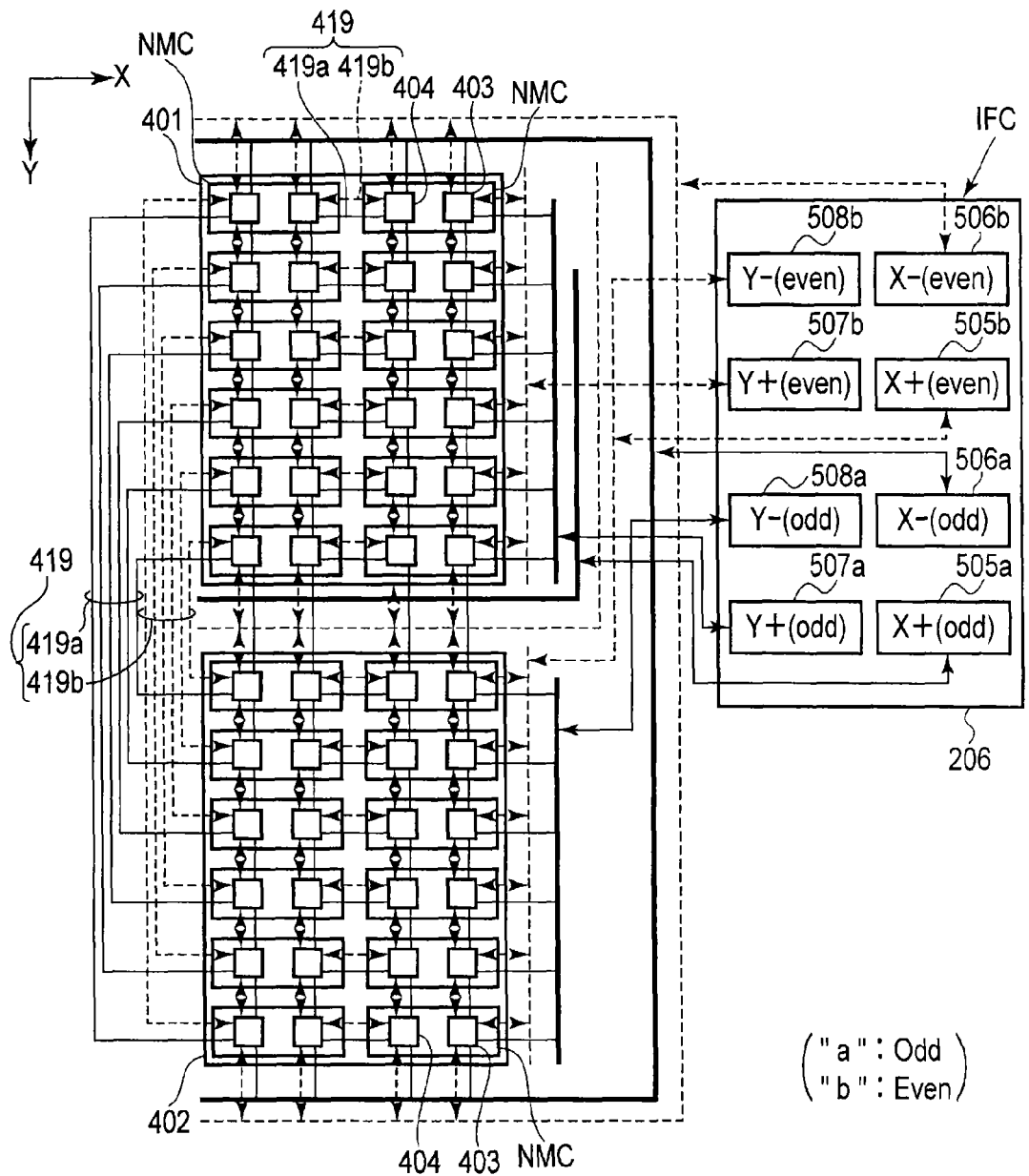
FIG. 25 is a diagram showing a relationship in connection between the NM card and the I/F card.

A relationship in connection between the IFC and NMC will be described with reference to FIG. 25. FIG. 25 is a diagram showing a relationship in electrical connection between the IFC and NMC. The connectors belonging to the odd group and the connectors belonging to the even group are distinguished from each other by adding alphabet "a" to the end of each of the reference numerals and adding alphabet "b" to the end of each of the reference numerals.

As shown in FIG. 25, two NMCs, which are physically adjacent to each other in the X direction, are connected to each other via one LVDS interface 419a and one LVDS interface 419b in each of the first and second blocks 401 and 402.

Two NMCs, which are physically adjacent to each other in the Y direction, are connected to each other via two LVDS interfaces 419a and two LVDS interfaces 419b in each of the first and second blocks 401 and 402.

The NMCs inserted in the lower part of the first block 401 are connected to the NMCs inserted in the lower part of the second block 402 in one-to-one correspondence via one LVDS interface 419a and one LVDS interface 419b.

The i-th NMC from the left of FIG. 25 in the lower part of the first block 401 is connected to the i-th NMC from the right of FIG. 25 in the lower part of the second block 402.

[Relationship in Logical Connection Between NMC and IFC]

With the foregoing physical connection, the first block 401 and the second block 402 differ in the X-direction definition and in the Y-direction definition. In other words, the right direction in FIG. 25 corresponds to the "X+" direction in the first block 401, and the left direction in FIG. 25 corresponds to the "X+" direction in the second block 402. In the first block 401, the up direction in FIG. 25 corresponds to the "Y+" direction. In the second block 402, the down direction in FIG. 25 corresponds to the "Y+" direction.

Thus, of the "X+"-direction LVDS interfaces 419 of the NMCs inserted at the right end of the first block 401 and the NMCs inserted at the left end of the second block 402, the LVDS interfaces 419a belonging to the odd group are connected to the connector 505a.

Of the "X+"-direction LVDS interfaces 419 of the NMCs inserted at the right end of the first block 401 and the NMCs inserted at the left end of the second block 402, the LVDS interfaces 419b belonging to the even group are connected to the connector 505b.

Of the "X−"-direction LVDS interfaces 419 of the NMCs inserted at the left end of the first block 401 and the NMCs inserted at the right end of the second block 402, the LVDS interfaces 419b belonging to the odd group are connected to the connector 506a.

Of the "X−"-direction LVDS interfaces 419 of the NMCs inserted at the left end of the first block 401 and the NMCs inserted at the right end of the second block 402, the LVDS interfaces 419b belonging to the even group are connected to the connector 506b.

Of the "Y+"-direction LVDS interfaces 419 of the NMCs inserted in the upper part of the first block 401, the LVDS interfaces 419a belonging to the odd group are connected to the connector 507a.

Of the "Y+"-direction LVDS interfaces 419 of the NMCs inserted in the upper part of the first block 401, the LVDS interfaces 419b belonging to the even group are connected to the connector 507b.

Of the "Y−"-direction LVDS interfaces 419 of the NMCs inserted in the upper part of the second block 402, the LVDS interfaces 419a belonging to the odd group are connected to the connector 508a.

Of the "Y−"-direction LVDS interfaces 419 of the NMCs inserted in the upper part of the second block 402, the LVDS interfaces 419b belonging to the even group are connected to the connector 508b.

[3-3. CUC (Configuration)]

Next, a configuration of the CUC will be described with reference to FIG. 26. FIG. 26 is a block diagram showing a configuration of the CUC.

As shown, the CUC includes a connector 611, first and second processors 601 and 602, DRAMs 603 and 604, two connectors 205 and SD sockets 609 and 610.

The connector 611 is a connection mechanism that is physically and electrically connected to the slots on the backplane 300. The CUC is able to carry out communications with another MMC and another NMC via the connector 611 and an interconnection formed on the backplane 300.

The first and second processors 601 and 602 execute their respective programs and each serve as a CU 110. In other words, one CUC corresponds to two CUs 11.

The first processor 601 is connected to the DRAM 603, and the DRAM 603 is used as a work area. The first processor 601 is connected to the SD socket 609. A MicroSD card 612, which previously stores programs to be executed by the first processor 601, is connected to the SD socket 609.

The first processor 601 is connected to one of the two connectors 205 via an interface 606 that conforms to the Ethernet standard. The first processor 601 is connected to the outside via the connector 205. The first processor 601 is also connected to the connector 611 via two PCIe interfaces 605. The first processor 601 is also connected to the connector 611 via one interface 607 that conforms to the Ethernet standard. Further, the first processor 601 is connected to the connector 611 via one I2C interface 608. The first processor 601 is also connected to the above NMC and MMC via the connector 611.

Similarly, the second processor 602 is connected to the DRAM 604, and the DRAM 604 is used as a work area. The second processor 602 is connected to the SD socket 610. A MicroSD card 613, which previously stores programs to be executed by the second processor 602, is connected to the SD socket 610.

Similarly, the second processor 602 is connected to one of the two connectors 205 via an interface 606 that conforms to the Ethernet standard. The second processor 602 is also connected to the connector 611 via two PCIe interfaces 605. The second processor 602 is connected to the outside via the connector 205. The second processor 602 is also connected to the connector 611 via one interface 607 that conforms to the Ethernet standard. Further, the second processor 602 is connected to the connector 611 via one I2C interface 608. The second processor 602 is also connected to the above NMC and MMC via the connector 611.

[3-4. MMC]

[3-4-1. Configuration]

Next, a configuration of the MMC will be described with reference to FIG. 27. FIG. 27 is a block diagram showing a configuration of the MMC.

As shown, the MMC includes a connector 720, a BMC chip 701, a third processor 702, DRAMs 703 and 704, a switch 705, a connector 207 and SD sockets 706 and 707.

The connector 720 is a connection mechanism that is physically and electrically connected to the slots on the backplane 300. The MMC 700 carries out communications with another MMC and another CUC via the connector 720 and an interconnection formed on the backplane 300.

[BMC Chip]

The BMC chip 701 is a chip that fulfills the functions of the above BMC. The BMC chip 701 is connected to the DRAM 703, and the DRAM 703 is used as a work area. The BMC chip 701 is connected to the SD socket 706. The BMC chip 701 is able to record different items of monitoring data on a MicroSD card 716 connected to the SD socket 706. The BMC chip 701 is connected to the connector 207 via an interface 708 that conforms to the Ethernet standard and is able to carry out communications with the outside via the connector 207.

[Third Processor]

The third processor 702 performs an NM control process for the storage unit 101 on the basis of programs. The third processor 702 is connected to the DRAM 704, and the DRAM 704 can be used as a work area. The third processor 702 is connected to the SD socket 707. A MicroSD card 717, which previously stores programs to be executed by the third processor 702, is connected to the SD socket 707.

The switch 705 is connected to the connector 720 via twelve interfaces 710, connected to the third processor 702 via one interface 711, and connected to the BMC chip 701 via one interface. The interfaces connected to the switch 705 conform to the Ethernet standard. The twelve interfaces 710 are connected to the processors (first processor 601, second processor 602) mounted on the CUC via the connector 720 and backplane 300. The switch 705 relays communications between the BMC chip 701 and the first, second and third processors 601, 602 and 702. The BMC chip 701 is able to acquire information generated by each of the processors, via the switch 705.

The BMC chip 701 is connected to the connector 720 via an I2C interface 712. The I2C interface 712 is branched to an I2C interface 713 on its way. The I2C interface 713 is connected to the third processor 702. The terminal alongside the connector 720 of the I2C interface 712 is connected to the first processor 601, second processor 602, first FPGA 403 and second FPGA 404 through the backplane 300 and the connectors of different cards. The BMC chip 701 monitors the first processor 601, second processor 602, first FPGA 403 and second FPGA 404 via the I2C interface 712. The monitoring data transmitted from the first processor 601, second processor 602, first FPGA 403 and second FPGA 404 is also referred to from the third processor 702 via the I2C interface 713. The third processor 702 is able to perform an NM control process using the monitoring data.

The third processor 702 is connected to the connector 720 via a PCIe interface 714. The terminal alongside the connector 720 of the PCIe interface 714 is connected to one NMC through the backplane 300. The third processor 702 transmits a packet for an arbitrary NC 140 to the PCIe interface 714 and receives a packet from an arbitrary NC 140 via the PCIe interface 714.

[3-4-2. Relationship in Connection Between MMC, CUC and NMC]

Figure 28:
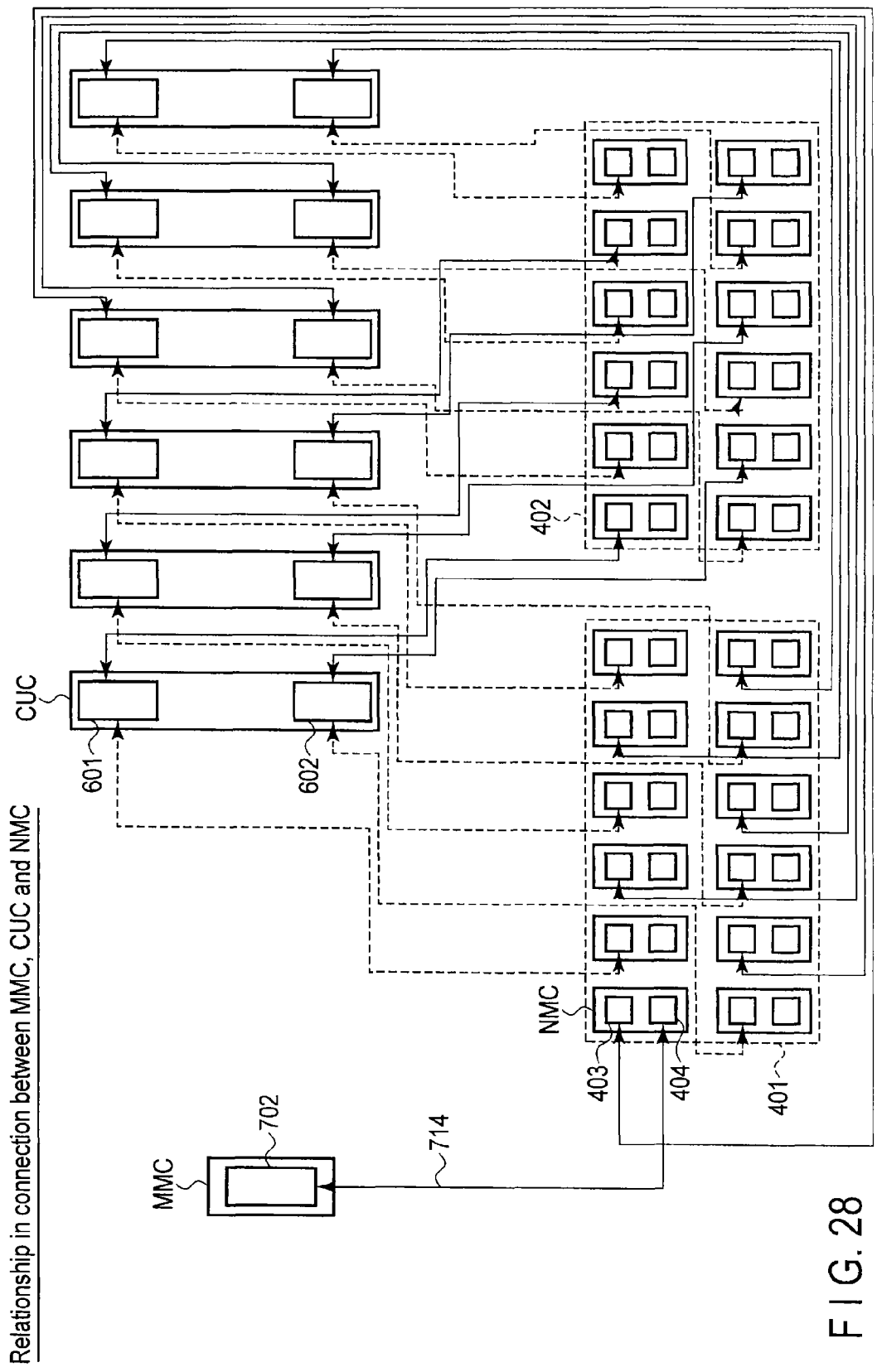
FIG. 28 is a diagram showing a relationship in connection between the NM card, CU card and MM card.

Next, a relationship in connection between the MMC, CUC and NMC will be described with reference to FIG. 28. FIG. 28 is a diagram showing a relationship in connection between the NMC, CUC and MMC. The connections shown in this figure are all made by the PCIe interface. Furthermore, the relationship in connection shown in the figure is achieved by the interconnection in each of the cards and the interconnection formed in the backplane 300.

As described above, each CUC includes four PCIe interfaces 605 and each NMC includes two PCIe interfaces 418. The four PCIe interfaces 605 are used for connection to different NMCs and thus each CUC is connected to four NMCs. One of the two PCIe interfaces 418 is used to connect each NMC to the CUC. Here, the PCIe interface 418 of the first FPGA 403 is used for connection to the CUC.

The first processors 601 of the left three CUCs shown in the figure are connected to different NMCs inserted in the upper part of the first block 401 and different NMCs inserted in the upper part of the second block 402. The second processors 602 of the left three CUCs shown in the figure are connected to different NMCs inserted in the lower part of the first block 401 and different NMCs inserted in the lower part of the second block 402.

The first processors 601 of the right three CUCs shown in the figure are connected to both different NMCs inserted in the upper part of the first block 401 and different NMCs inserted in the upper part of the second block 402. The second processors 602 of the right three CUCs shown in the figure are connected to different NMCs inserted in the lower part of the first block 401 and different NMCs inserted in the lower part of the second block 402.

As has been described above, each CUC is connected to both the NMCs belonging to the first block 401 and the NMCs belonging to the second block 402. Thus, even though NMCs are inserted in only one of the first and second blocks 401 and 402, each CUC is able to cause the inserted NMCs to fulfill the function of the CU 11. Furthermore, irrespective of whether NMCs are inserted in both the first block 401 and the second block 402, the CUCs the number of which is any one from one to six can be operated.

As will be described below, the MMC is connected to only one NMC belonging to the first block 401 and thus the enclosure 200 is operated while the NMCs are connected to at least the first block 401. When the MMC is connected to an arbitrary NMC belonging to the second block 402, the enclosure 200 can be operated while the NMC is inserted into only the second block 402.

The MMC includes one PCIe interface 714. When the PCIe interface 714 is used, the MMC is connected to one NMC. In the NMC, the PCIe interface 418 of the second FPGA 404 is used for connection to the MMC. The MMC is connected to an NMC inserted in the upper leftmost part of the first block 401. The MMC is able to transmit and receive a packet via the PCIe interface 714.

[3-4-3. Relationship in Connection Between MMC and CUC]

Next, a relationship in connection between the MMC and CUC will be described with reference to FIG. 29. FIG. 29 is a diagram showing a relationship in connection between the CUC and MMC.

In FIG. 29, a connection using an I2C interface is omitted and a relationship in connection using an interface that conforms to the Ethernet standard is shown. The relationship in connection shown in the figure is achieved by the interconnection in each of the cards and the interconnection formed in the backplane 300.

The MMC includes twelve interfaces 710 that conform to the Ethernet standard. Each CUC includes two interfaces 607 that conform to the Ethernet standard. The MMC is connected to six CUCs using two interfaces 710 for each CUC.

[4. Example of Connection for Scale-Out]

Next, an example of connection for scaling out the storage unit 101 will be described with reference to FIGS. 30 to 32.

Hereinafter, an example of connection for constructing one storage unit 101 using two storage systems 100 of one enclosure 200 (connection example 1) will be described. To distinguish a plurality of storage systems from one another, an alphabet is added to the end of the reference numeral of each of the storage systems 100.

FIG. 30 is a diagram showing a connector group for use in connection example 1. FIG. 31 is a diagram showing a specific connection relationship according to connection example 1. FIG. 32 is a diagram showing a storage unit 101 constructed logically by connection example 1.

As shown in FIG. 30, in connection example 1, the connector 206 of one (storage system 100A) of the two storage systems 100 of one enclosure 200 is connected to the connector 206 of the other (storage system 100B).

Figure 31:
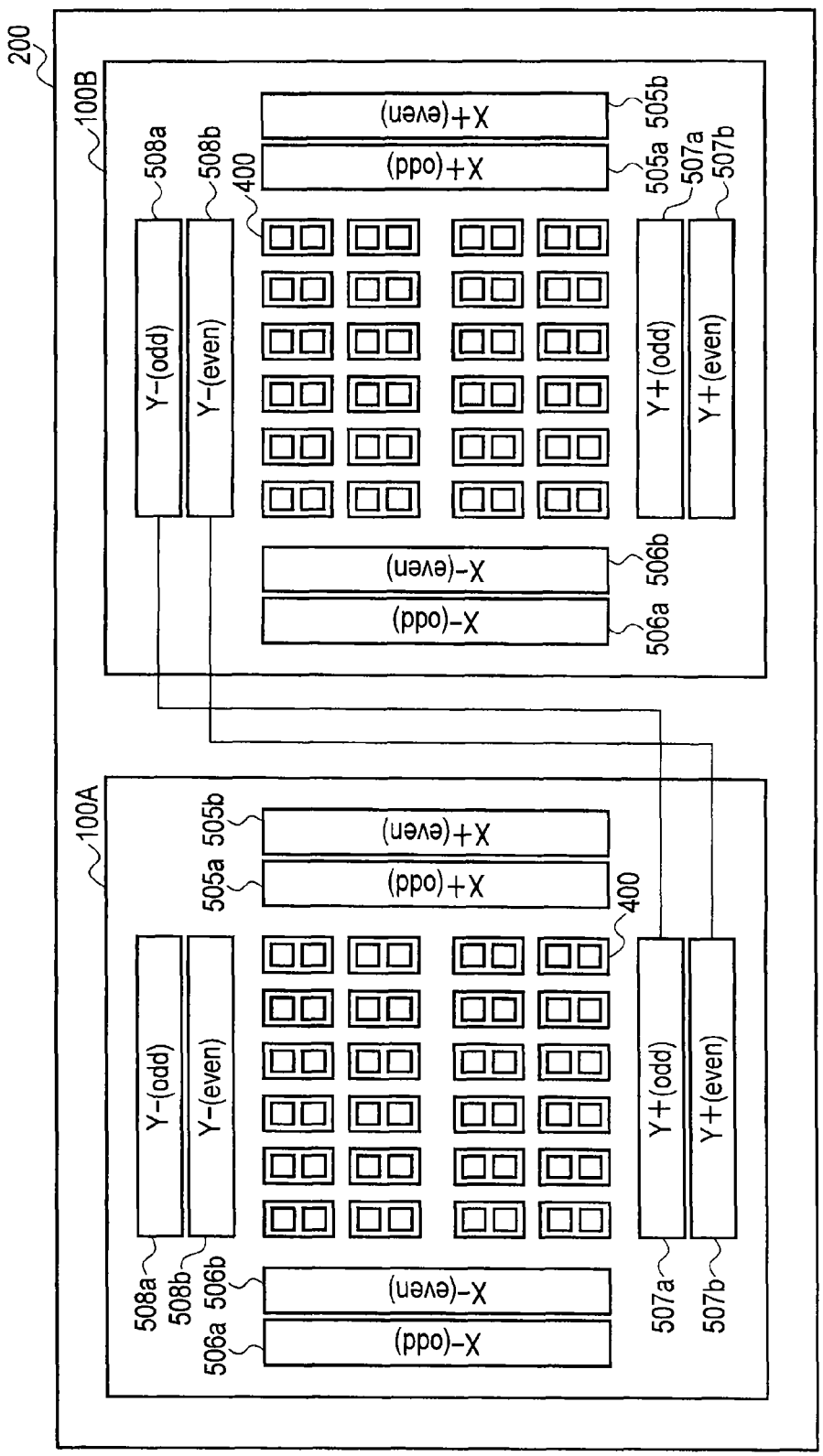
FIG. 31 is a diagram showing a specific connection relationship according to connection example 1.

Specifically, as shown in FIG. 31, the connector 507a of the storage system 100A is connected to the connector 508a of the storage system 100B. The connector 507b of the storage system 100A is connected to the connector 508b of the storage system 100B. With these connections, the storage unit 101B of the storage system 100B is connected in the "Y+" direction of the storage unit 101A of the storage system 100A.

As a result, as shown in FIG. 32, the storage units 101A and 101B of the storage systems 100A and 100B are integrated to configure a new storage unit 101 logically. The new storage unit 101 includes six NMCs arranged in the X direction and eight NMCs arranged in the Y direction.

In connection example 1, two storage units 101 are connected in the Y direction; however, this example is not limited to this. For example, two storage units 101 can be connected in the X direction.

[Advantageous Effect]

The configuration and operation of the storage system 100 according to the second embodiment as described above can bring about the same advantages as at least the following advantageous effects (1) and (2). Further, the storage system 100 according to the second embodiment can bring about at least the following advantageous effect (3).

(3) Both an increase in capacity and a decrease in latency can be achieved.

For the advantageous effect (3), the technical background of the storage system will be described.

A) Technical Background

Recently, an amount of data treated by enterprises and governments has greatly been increased more and more, and data processing has greatly been complicated more and more. For the big data processing, there is a tendency to require a data processing platform that allows big data processing having 3V (volume, variety, velocity) with efficiency.

However, in a system represented by, e.g., Hadoop, a number of processes corresponding to data management is required prior to the start of actual computing such as data transfer, preprocessing and metadata processing. Even though a large number of processors are arranged and a platform is prepared to perform the processes at the same, it is difficult to perform a desired data process at high speed and with efficiency, because data consistency management is increased in its complexity by dispersing data.

Furthermore, the degree of the above difficulty is greatly increased as an amount of data and a required processing speed are increased. If this system is configured by the combination of general-purpose products, a tradeoff between data size and latency will be a bother. In other words, in order to increase data size to be treated, latency has to be sacrificed. In order to decrease latency, data size to be treated has to be decreased. More specifically, there are hardly any platforms capable of treating data size in the order exceeding TB (terabit) and achieving submillisecond latency. Moreover, even though there is such a platform, the system will be very expensive.

B) Second Embodiment

In view of the foregoing technical background, the storage system according to the second embodiment includes at least the following two configurations.

First, all active data items are stored in the NAND memory 141 (405 to 408, 411 to 414) of the first memory of the NM 140. The NAND memory 141 is used as both an "inexpensive bit cost" memory which can provide a system capable of storing a large-scale database at reasonable costs and a "nonvolatile" memory necessary for satisfying high reliability, which is resistible to utilization of enterprises. Thus, the storage system 100 according to the second embodiment is more suitable for constructing a large-scale, high-reliability database than, for example, a storage system of a DRAM-based main memory. Furthermore, the storage system 100 has access speed sufficient for achieving the "submillisecond order" latency which is required in big data processing. These characteristics are very difficult to achieve in, for example, an HDD-based storage system.

Secondly, the memory system according to the second embodiment includes PMUs 112 and routing circuits 111 which are network ports via which the NCs 140C, which read and write data of the NAND memory 141, transmit packet data to each other and receive it from each other. The network ports are connected to each other to configure a two-dimensional meshed network. Accordingly, the entire network can be regarded as a (single) very large nonvolatile memory which can be accessed in a single address space. The NCs 140C include an interface (here, PCIe I/F 113) which is directly connectable to the CU 110. Accordingly, the very large nonvolatile memory space can be shared among a plurality of CPUs 601 of a plurality of CUs 110. In other words, the memory system 100 according to the second embodiment is advantageous in that a number of CPUs 601 perform a large-scale parallel operation through a single very large database. Therefore, it can be said that the system is suitable as a platform for analyzing big data which includes the foregoing 3V.

For example, as shown in FIGS. 12 to 30-32, in the storage system 100 according to the second embodiment, two storage systems 100A and 100 B can electrically be connected to each other via the I/F unit 120 to scale out the storage unit 101. If the storage unit 101 is scaled out, its capacity can greatly be increased.

Figure 10:
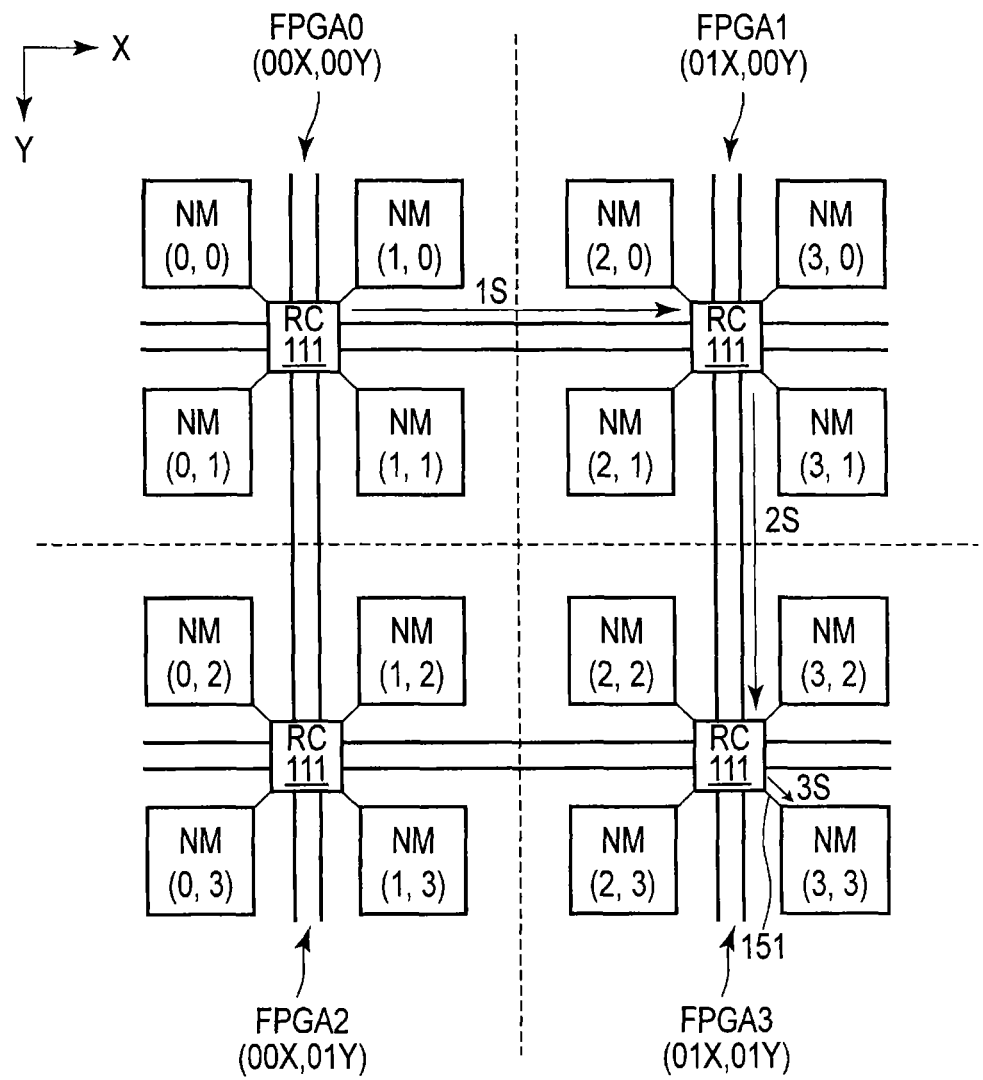
FIG. 10 is a diagram illustrating the number of transfer steps according to the first embodiment.

Furthermore, as shown in FIG. 10, for example, in the storage system 100 according to the second embodiment, the number of steps can be reduced even though the storage system is scaled out. Accordingly, latency due to an increase in the number of steps can be shortened.

As described above, according to the configuration and operation of the storage system 100 according to the second embodiment, both an increase in capacity and a decrease in latency can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a storage unit which includes a plurality of memory units and a plurality of routing units, wherein each of the plurality of memory units includes a nonvolatile memory and a control unit which controls the nonvolatile memory;
a connection unit via which the storage unit is connected to exterior to control the storage unit; and
a management unit which performs at least monitoring of power supply voltages of the storage unit and the connection unit,
wherein a first routing unit of the plurality of routing units is connected to one or more memory units of the plurality of memory units, controls transfer of a packet between at least two of the plurality of routing units, and uses a part of a destination address described in the packet, wherein the destination address specifies a memory unit of the plurality of memory units, and the part of the destination address specifies a routing unit of the plurality of routing units which is connected to the specified memory unit.

2. The storage system of claim 1, wherein the routing unit does not use at least one bit of the destination address.

3. The storage system of claim 1, wherein the routing unit does not use the least significant bit of the destination address.

4. The storage system of claim 1, wherein the routing unit does not use the least significant bit of the destination address but uses higher-order bits other than the least significant bit.

5. The storage system of claim 1, wherein the storage unit further includes a packet management unit which analyzes a packet transferred from the first routing unit and transmits the packet to a memory unit of the plurality of memory units on the basis of a result of the analysis.

6. The storage system of claim 5, wherein the storage unit further includes a connection unit interface which analyzes a packet transmitted from the connection unit and transmits the packet to the packet management unit on the basis of a result of the analysis.

7. The storage system of claim 1, wherein the first routing unit determines whether the part of the destination address is directed to the first routing unit or not.

8. The storage system of claim 7, wherein the first routing unit transfers the packet to another routing unit in a route with the minimum number of transfers when the part of the destination address is not directed to the first routing unit.

9. The storage system of claim 7, wherein the first routing unit assigns the packet to one of the one or more memory units on the basis of the destination address when the part of the destination address is directed to the first routing unit.

10. The storage system of claim 1, further comprising a power supply unit which converts an external power supply voltage applied from an external power supply into a power supply voltage and applies the converted power supply voltage to at least the storage unit.

11. The storage system of claim 10, further comprising a backup battery unit which receives a power supply voltage from the power supply unit and charges up itself, wherein the battery backup unit applies a backup battery voltage to at least the storage unit when the storage system is electrically shut off from the external power supply.

12. The storage system of claim 1, wherein the routing units are external to the memory units.

13. A method of controlling a storage system which includes a plurality of memory units and a plurality of routing units, each of the plurality of memory units including a nonvolatile memory and a control unit which controls the nonvolatile memory, the method comprising:

controlling transfer of a packet between at least two of the plurality of routing units by a first routing unit of the plurality of routing units which is connected to one or more memory units of the plurality of memory units; and performing routing the packet using a part of a destination address described in the packet by the first routing unit, wherein the destination address specifies a memory unit of the plurality of memory units, and the part of the destination address specifies a routing unit of the plurality of routing units which is connected to the specified memory unit.

14. The method of claim 13, wherein the part of the destination address does not include at least one bit of the destination address.

15. The method of claim 13, wherein the part of the destination address does not include the least significant bit of the destination address.

16. The method of claim 13, wherein the part of the destination address includes higher-order bits other than the least significant bit of the destination address.

17. The method of claim 13, further comprising determining whether the part of the destination address is directed to the first routing unit by the first routing unit.

18. The method of claim 13, further comprising transferring the packet to another routing unit in a route with the minimum number of transfers by the first routing unit when the part of the destination address is not directed to the first routing unit.

19. The method of claim 13, further comprising assigning the packet to one of the one or more memory units on the basis of the destination address recognized by the first routing unit when the part of the destination address is directed to the first routing unit.

20. A storage system comprising:

a plurality of memory units each including a nonvolatile memory and a control unit which controls the nonvolatile memory; and a plurality of routing units, wherein a routing unit of the plurality of routing units is connected to one or more memory units of the plurality of memory units, controls transfer of a packet between at least two of the plurality of routing units, and performs routing the packet using a part of a destination full address described in the packet, wherein the destination address specifies a memory unit of the plurality of memory units, and the part of the destination address specifies a routing unit of the plurality of routing units which is connected to the specified memory unit.

* * * * *